(12) United States Patent
Tateishi et al.

(10) Patent No.: US 7,672,209 B2
(45) Date of Patent: Mar. 2, 2010

(54) HOLOGRAM RECORDING/REPRODUCING APPARATUS, HOLOGRAM REPRODUCING APPARATUS AND METHOD, AND COMPUTER PROGRAM

(75) Inventors: Kiyoshi Tateishi, Saitama (JP); Michikazu Hashimoto, Saitama (JP)

(73) Assignee: Pioneer Corporation, Tokyo (JP)

( * ) Notice: Subject to any disclaimer, the term of this patent is extended or adjusted under 35 U.S.C. 154(b) by 396 days.

(21) Appl. No.: 11/631,318

(22) PCT Filed: Jul. 7, 2005

(86) PCT No.: PCT/JP2005/012566

§ 371 (c)(1),
(2), (4) Date: Mar. 8, 2007

(87) PCT Pub. No.: WO2006/006488

PCT Pub. Date: Jan. 19, 2006

(65) Prior Publication Data

US 2007/0247686 A1 Oct. 25, 2007

(30) Foreign Application Priority Data

Jul. 8, 2004 (JP) ............................. 2004-201652

(51) Int. Cl.
G11B 11/00 (2006.01)
G11B 7/00 (2006.01)
(52) U.S. Cl. .................................. 369/53.19; 369/103
(58) Field of Classification Search ................... 359/21, 359/22, 32; 369/103, 53.19
See application file for complete search history.

(56) References Cited

U.S. PATENT DOCUMENTS

| 5,475,209 A | 12/1995 | Nabeshima |
| 5,504,596 A | 4/1996 | Goto et al. |
| 5,920,536 A | 7/1999 | Campbell et al. |
| 6,233,083 B1 | 5/2001 | Minagawa |

(Continued)

FOREIGN PATENT DOCUMENTS

JP 02-282981 11/1990

(Continued)

OTHER PUBLICATIONS

International Search Report for PCT/JP2005/012566 mailed Oct. 18, 2005.

*Primary Examiner*—Alessandro Amari
(74) *Attorney, Agent, or Firm*—Nixon & Vanderhye, PC

(57) ABSTRACT

An example hologram recording/reproduction device reproduces recorded information from a holographic recording medium where interference fringes formed by a reference light and an object light corresponding to the recording information are recorded. The example hologram recording/reproduction device irradiates the reference light to a holographic recording medium; generates detection information data (Ddet) according to the detection light generated by irradiation of the reference light; sets a target irradiation position of the reference light on the surface of the holographic recording medium according to the detection information data; and moves the irradiation means with respect to the holographic recording medium along its surface so that the reference light is irradiated to the target irradiation position.

17 Claims, 12 Drawing Sheets

U.S. PATENT DOCUMENTS

| | | |
|---|---|---|
| 6,445,470 B1 | 9/2002 | Jenkins et al. |
| 6,486,982 B1 | 11/2002 | Davis |
| 6,538,740 B1 | 3/2003 | Shiraishi et al. |
| 6,728,008 B1 | 4/2004 | Kamisuwa |
| 6,729,541 B1 | 5/2004 | Kurokawa et al. |
| 7,002,891 B2 | 2/2006 | Horimai |
| 7,236,441 B2 | 6/2007 | Tanaka et al. |
| 7,248,389 B2 | 7/2007 | Toishi |
| 7,262,892 B1 | 8/2007 | Yasuda et al. |
| 7,321,541 B2 | 1/2008 | Horimai |
| 7,471,609 B2 | 12/2008 | Tateishi et al. |
| 7,492,692 B2 | 2/2009 | Tateishi et al. |
| 2002/0075776 A1 | 6/2002 | Kasazumi et al. |
| 2004/0037196 A1* | 2/2004 | Matsumoto et al. ...... 369/53.19 |
| 2004/0042374 A1 | 3/2004 | Horimai |
| 2005/0135217 A1 | 6/2005 | Tateishi et al. |
| 2005/0147013 A1 | 7/2005 | Tateishi et al. |
| 2005/0162719 A1* | 7/2005 | Ogasawara et al. ........... 359/22 |
| 2006/0033987 A1 | 2/2006 | Stelzer et al. |
| 2006/0077852 A1 | 4/2006 | Tateishi et al. |
| 2007/0115789 A1 | 5/2007 | Liedenbaum |
| 2007/0121185 A1 | 5/2007 | Tsukagoshi et al. |

FOREIGN PATENT DOCUMENTS

| | | |
|---|---|---|
| JP | 08-335322 | 12/1996 |
| JP | 9-288309 | 11/1997 |
| JP | 11-16374 | 1/1999 |
| JP | 2002-063733 | 2/2000 |
| JP | 2000-122012 | 4/2000 |
| JP | 2000-268381 | 9/2000 |
| JP | 2000-284671 | 10/2000 |
| JP | 2001-273650 | 10/2001 |
| JP | 2002-63733 | 2/2002 |
| JP | 2002-123949 | 4/2002 |
| JP | 2004-139691 | 5/2004 |

* cited by examiner

[FIG. 1]
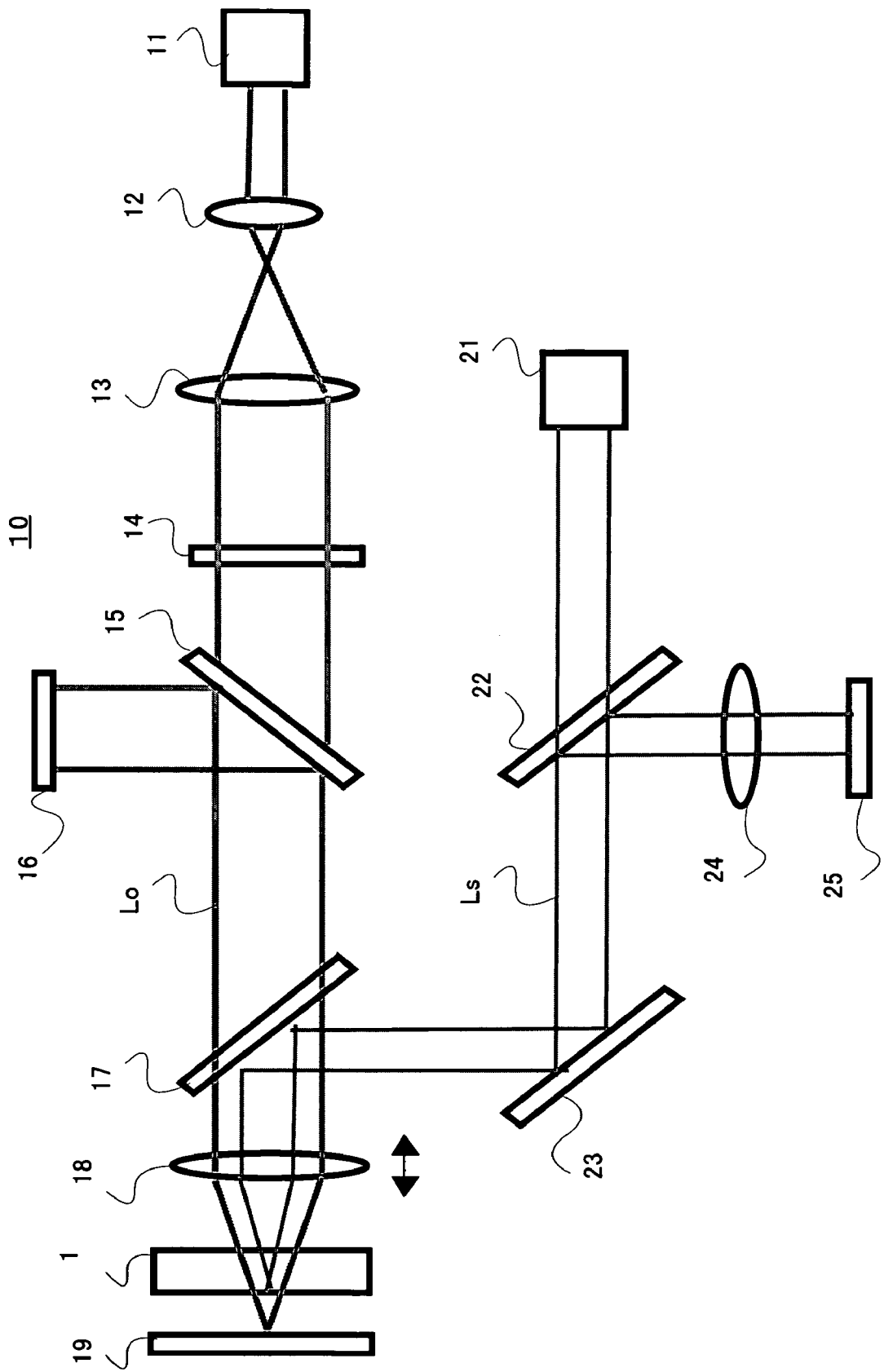

[FIG. 2]
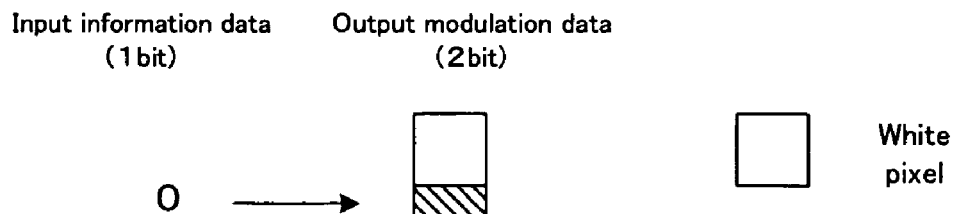
(a)
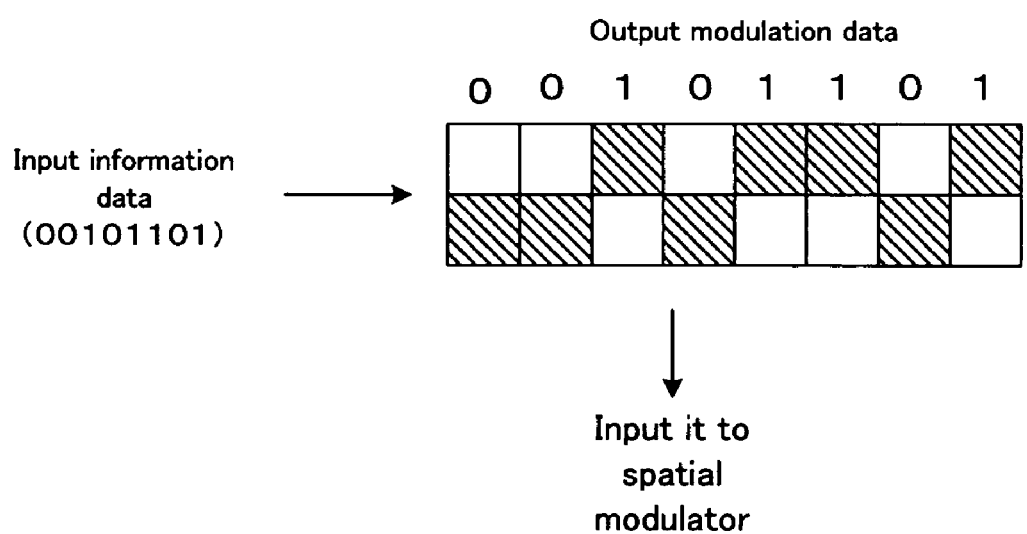
(b)

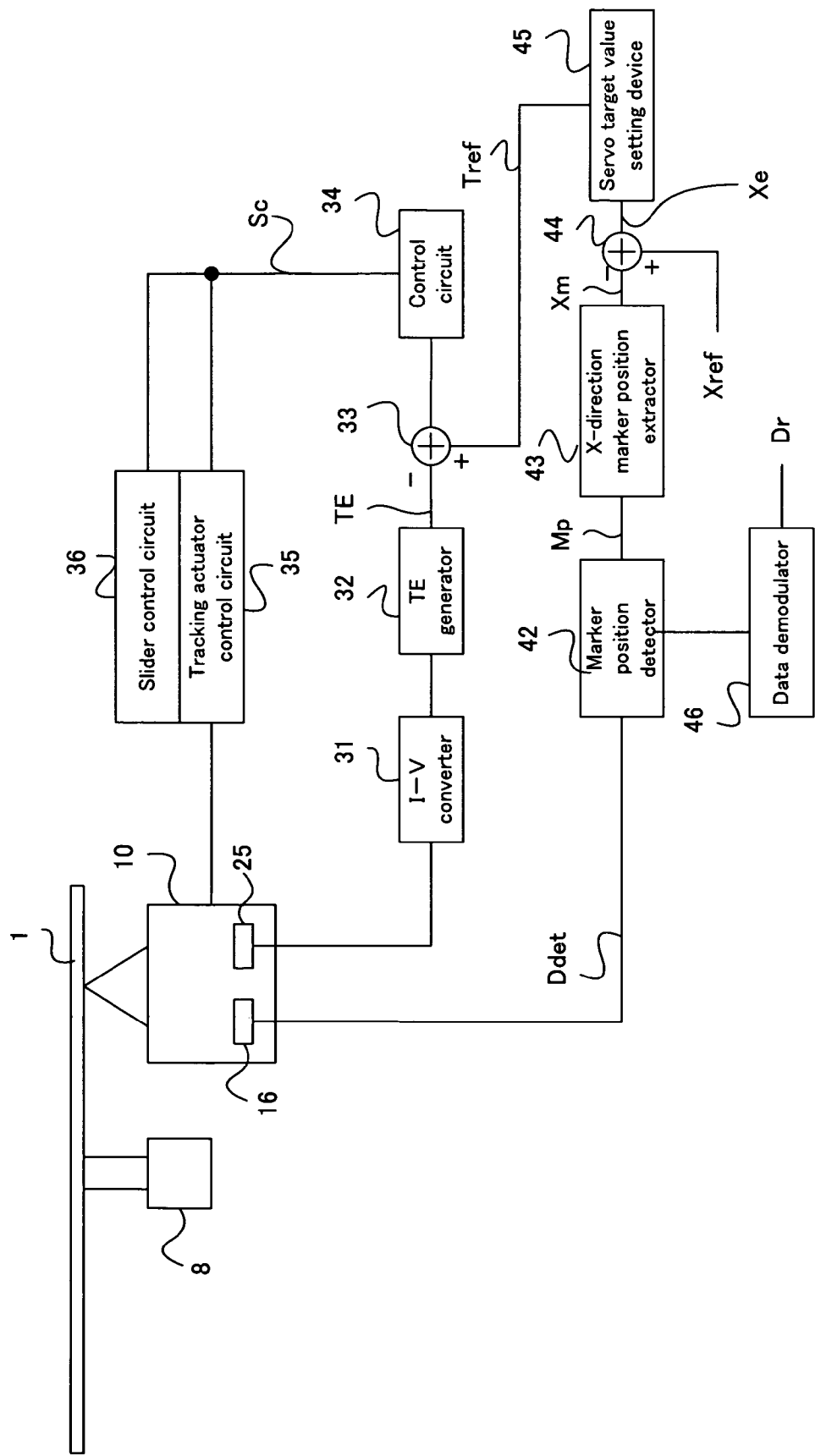
[FIG. 3]

[FIG. 4]
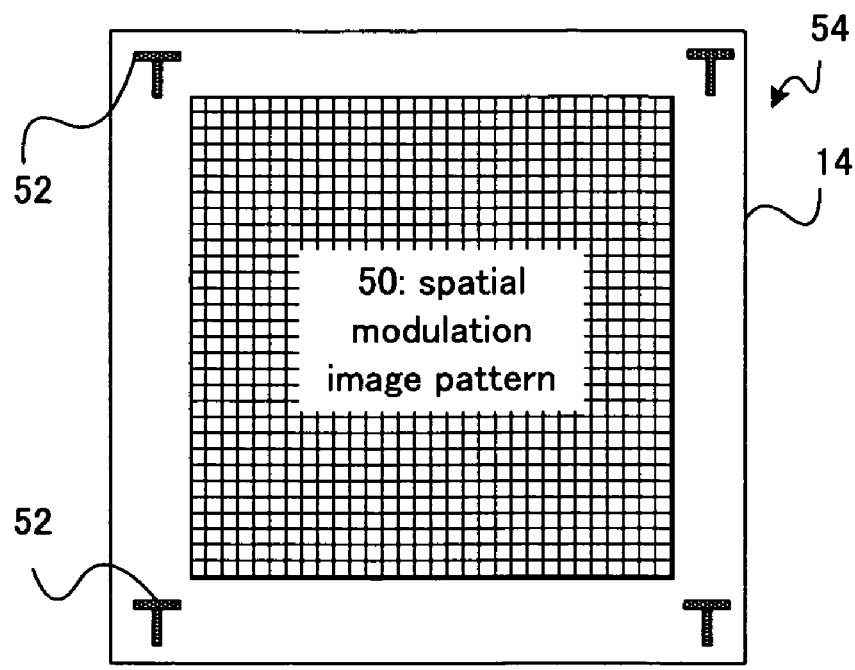
[FIG. 5]
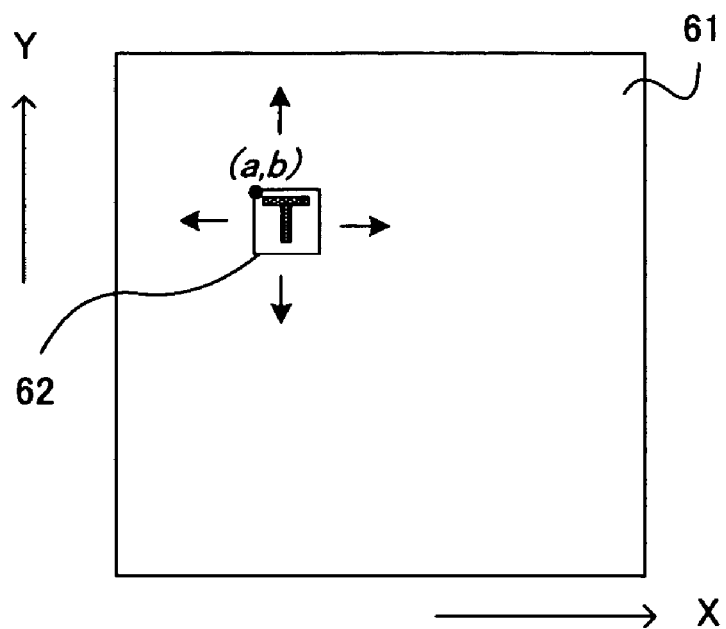

[FIG. 6]
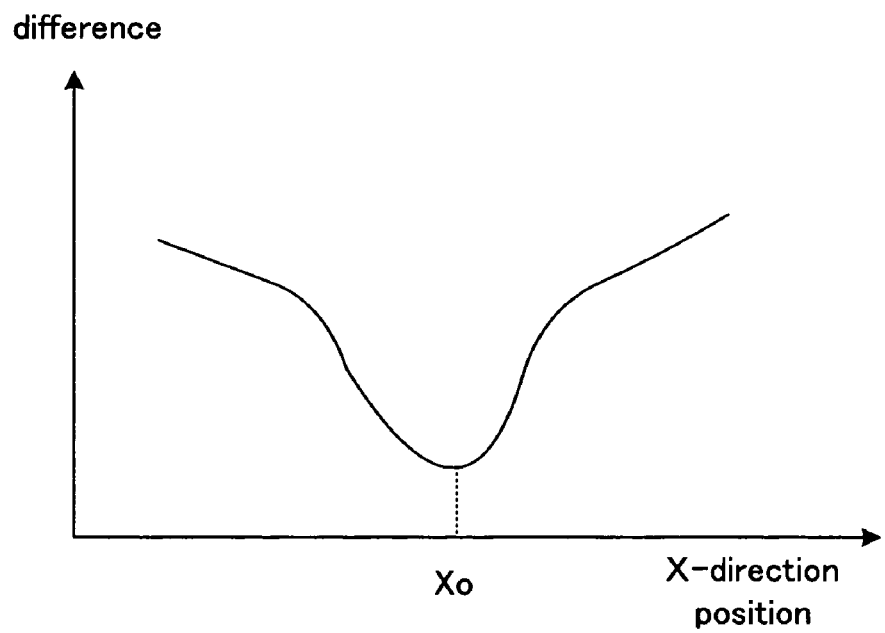
(a)
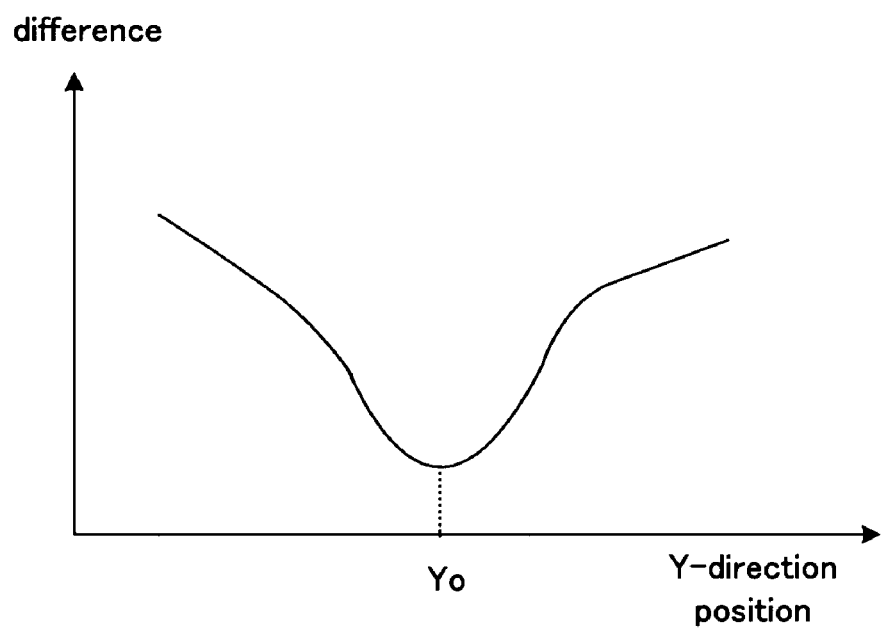
(b)

[FIG. 7]
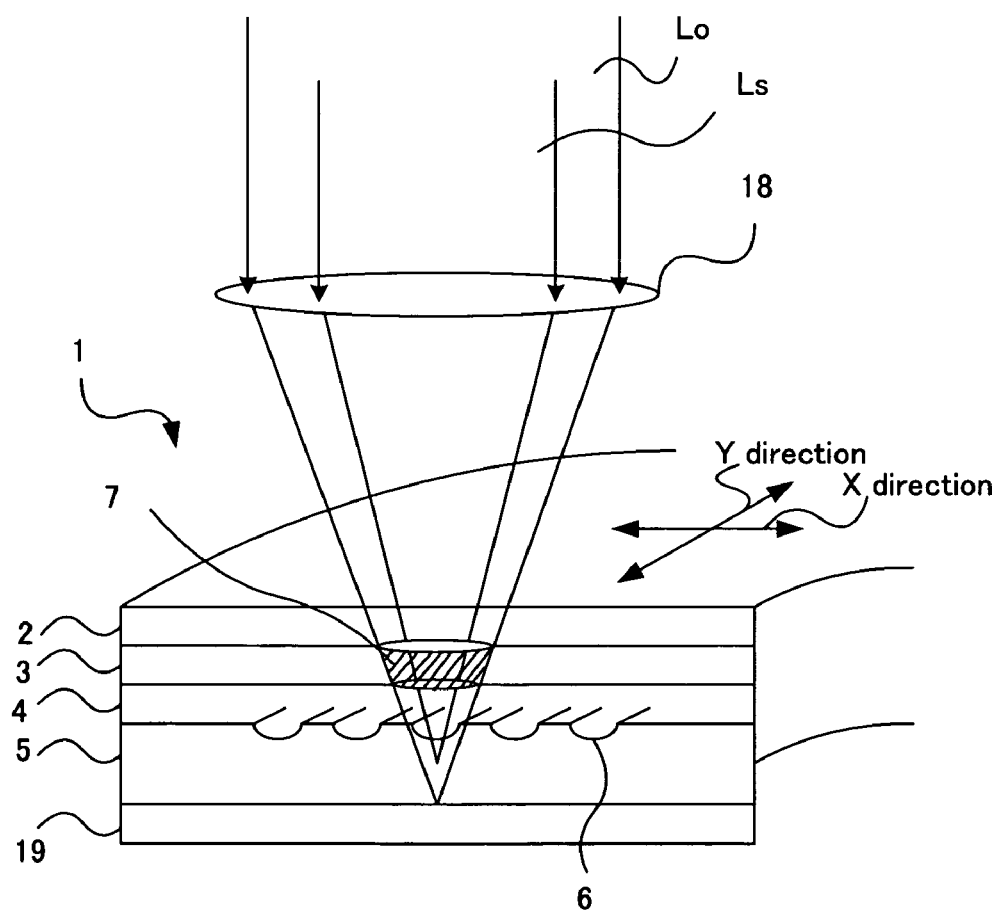

[FIG. 8]
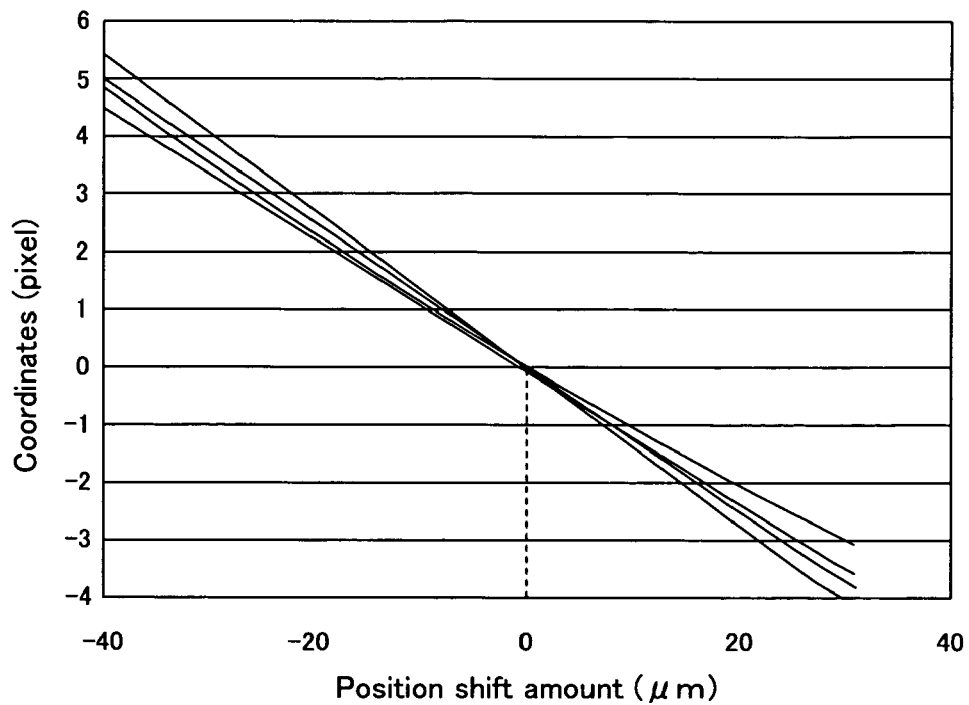
(a)
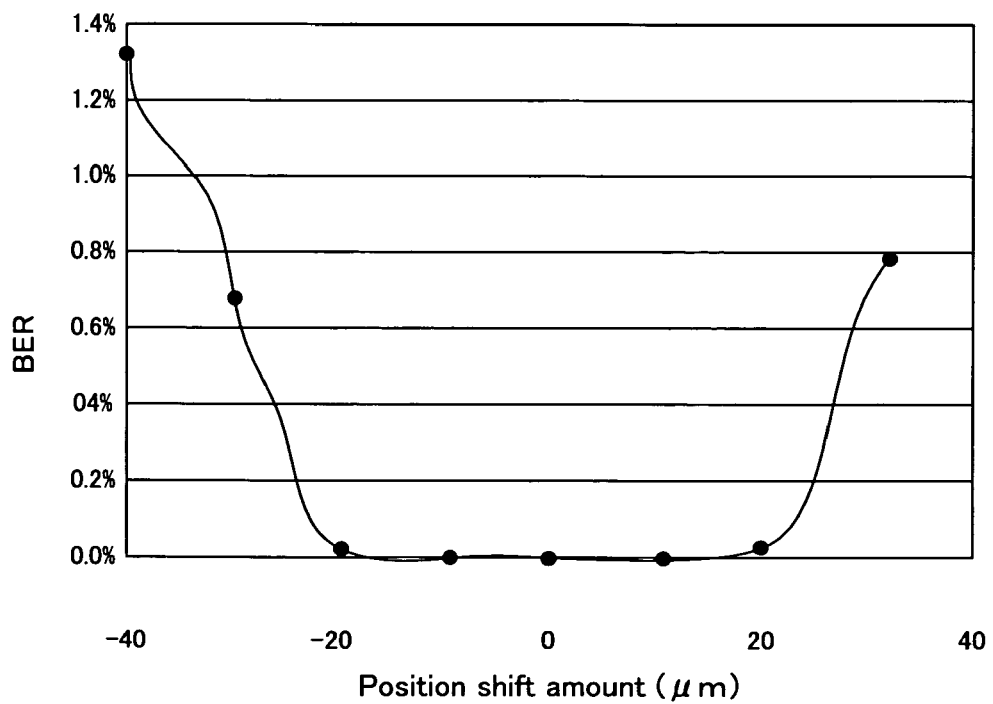
(b)

[FIG. 9]
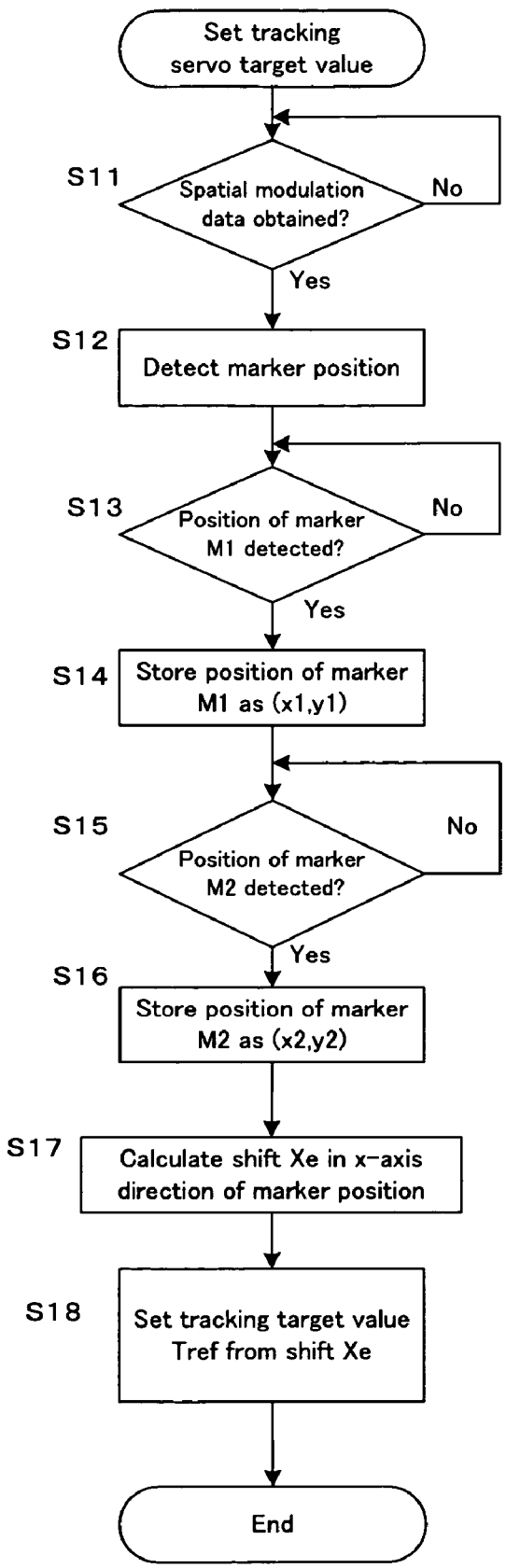

[FIG. 10]
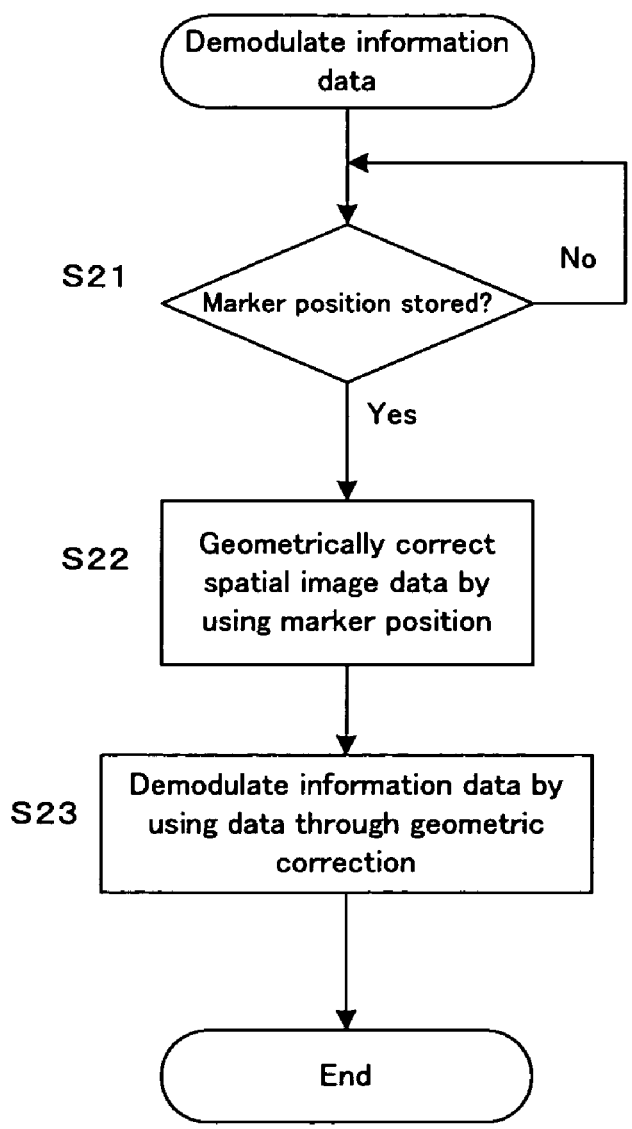

[FIG. 11]
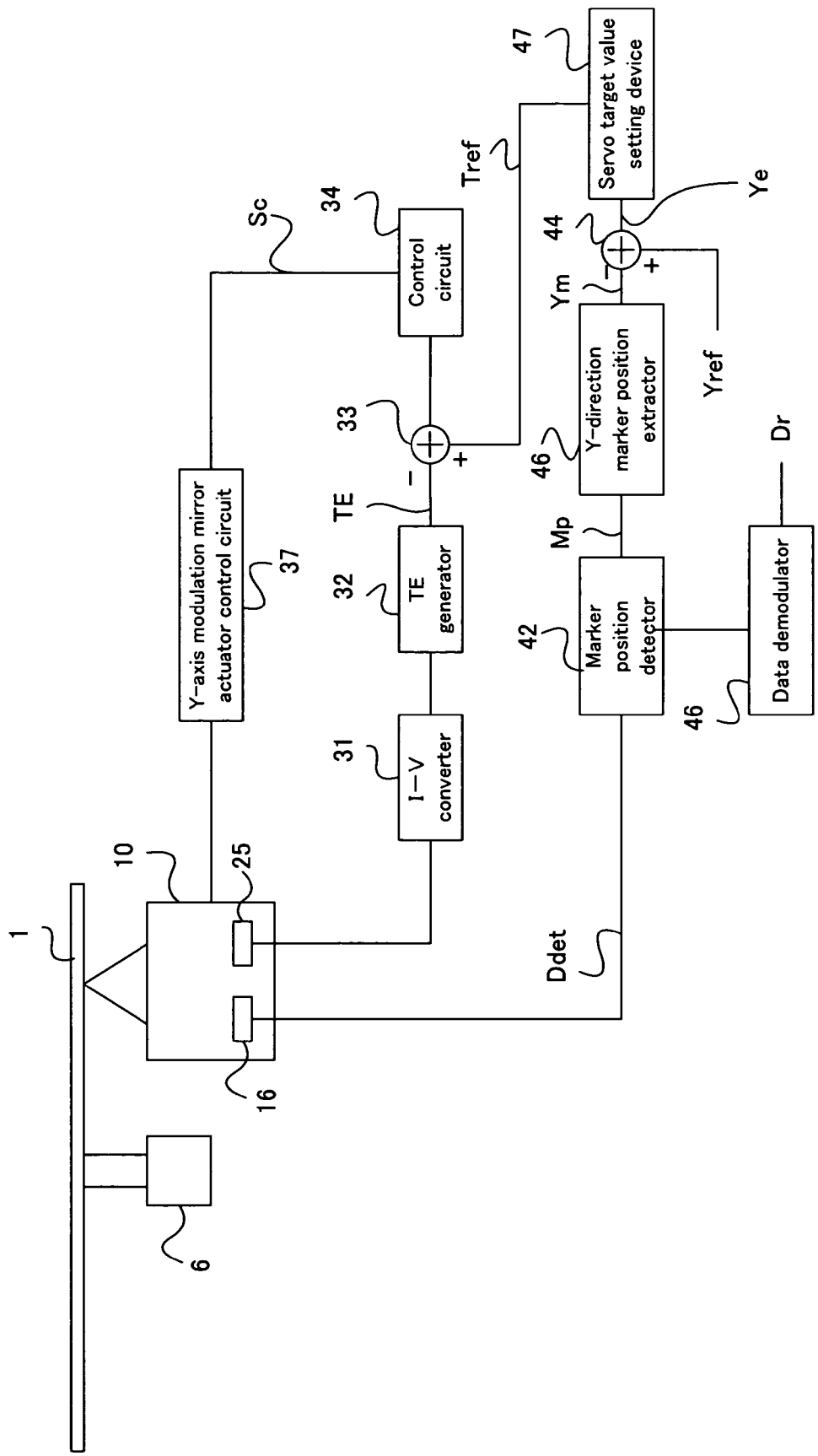

[FIG. 12]
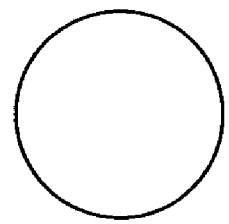
One page
(a)
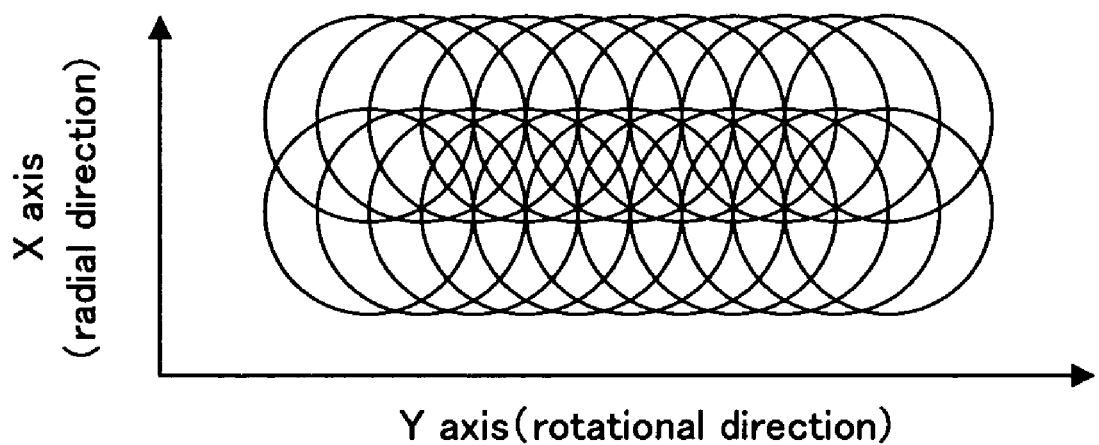
(b)
Shift multiplexed page

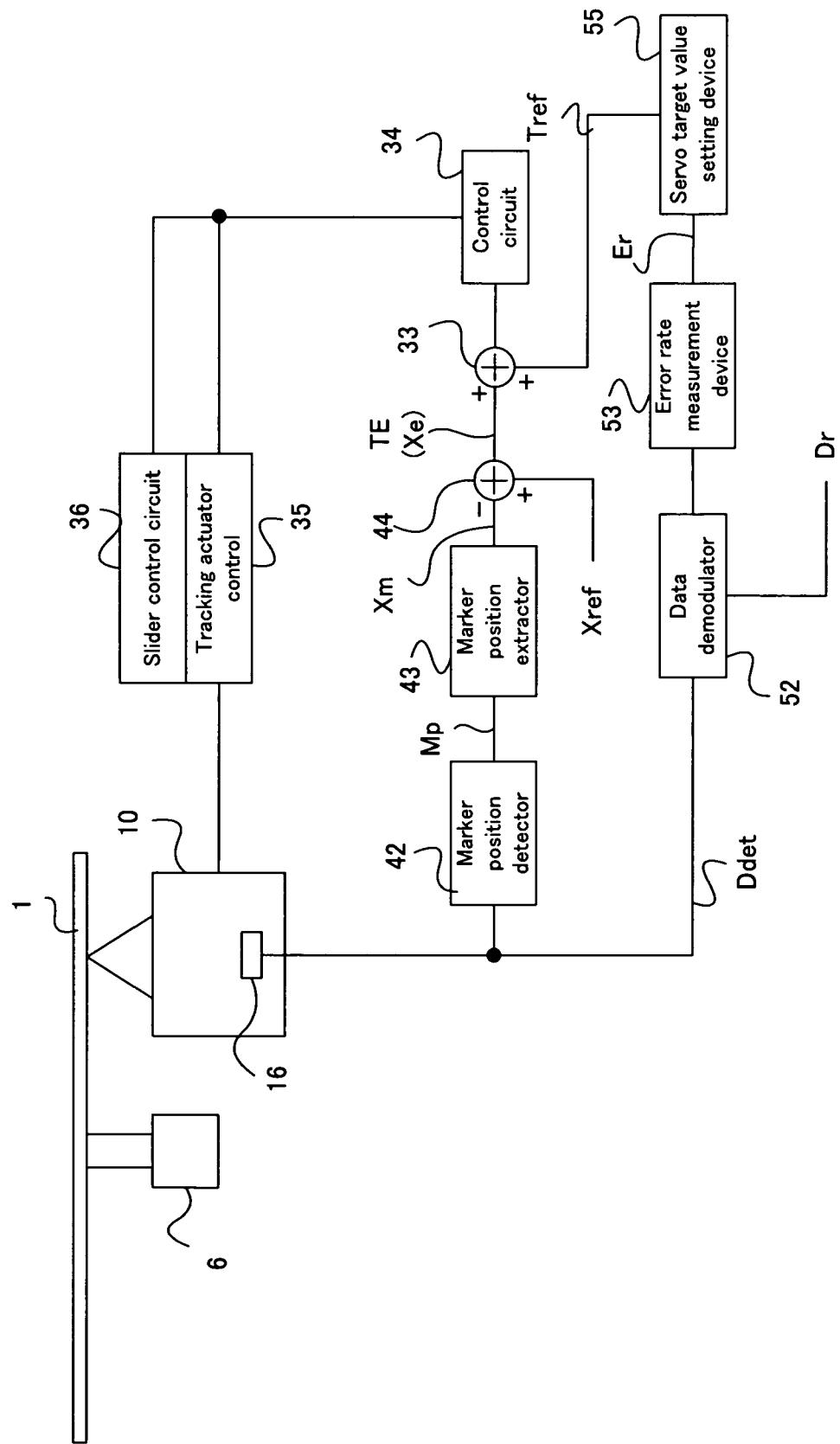
[FIG. 13]

HOLOGRAM RECORDING/REPRODUCING APPARATUS, HOLOGRAM REPRODUCING APPARATUS AND METHOD, AND COMPUTER PROGRAM

This application is a US national phase of International Patent Application No. PCT/JP2005/012566 filed Jul. 7, 2005, which designated the U.S. and claims priority of Japanese Patent Application No. JP2004-201652 filed Jul. 8, 2004, the entire contents of each of which are hereby incorporated by reference in this application.

TECHNICAL FIELD

The present invention relates to a hologram recording/reproducing apparatus for and a hologram recording/reproducing method of recording and reproducing information with respect to a holographic recording medium, a hologram reproducing apparatus, a hologram reproducing method, and a computer program used for the hologram recording/reproducing apparatus and the hologram reproducing apparatus.

BACKGROUND ART

There is known a hologram recording technique of recording information to be recorded, as an interference pattern, into a holographic recording medium (hereinafter merely referred to as a "recording medium"). One method is to spatial-modulate light from a light source in accordance with the information to be recorded, to thereby generate object light, and irradiate the recording medium with the object light and reference light. The object light and the reference light form the interference pattern on the recording medium, and the interference pattern is recorded into a recording layer of the recording medium. On the other hand, in reproduction, the interference pattern recorded in the recording medium is irradiated only with the reference light, and detection light from the recording medium is detected by a 2-dimensional (2D) sensor, to thereby reproduce the information.

As in the information recording on an optical disc or the like, even in the hologram recording, the object light and the reference light are focused on the recording medium, by using an objective lens or the like. Therefore, in order to accurately perform the information recording or reproduction, so-called tracking servo control is required, which is to control the position of the objective lens with respect to the recording medium. A patent document 1 describes an example of the tracking servo control of drive-controlling the objective lens on the basis of a tracking error signal, which is generated by irradiating laser light onto a guide groove formed in advance on the recording medium, on a hologram recording/reproducing apparatus. Incidentally, there are patent documents 2 and 3, for example, as other documents which describe the hologram recording.

Patent document 1: Japanese Patent Application Laid Open NO. 2001-273650
Patent document 2: Japanese Patent Application Laid Open NO. 2002-63733
Patent document 3: Japanese Patent Application Laid Open NO. 2000-122012

DISCLOSURE OF INVENTION

Subject to be Solved by the Invention

However, the information cannot be always recorded with having a preferable positional relationship (i.e. without deviation or shift) with respect to the guide groove, as in the configuration described in the above-mentioned patent document 1, depending on the accuracy of the tracking servo control in the information recording. Not only the internal factors caused by the recording/reproducing apparatus described above, but also external factors, such as the contraction of the recording medium after the information recording and the contraction and expansion of the recording medium caused by a change in temperature and irradiation of light or the like, may cause a shift between the guide groove and the information to be recorded, in some cases. In this case, there is such a technical problem that it is difficult or impossible to properly reproduce the information even if the tracking servo control is performed with referring to the guide groove as in the patent document 1.

It is therefore an object of the present invention to provide a hologram recording/reproducing apparatus and a hologram recording/reproducing method, a hologram reproducing apparatus, and a hologram reproducing method, which allow more proper tracking servo control, and a computer program which makes a computer execute as the hologram recording/reproducing apparatus and the hologram reproducing apparatus.

Means For Solving The Subject (Hologram Reproducing Apparatus)

The above object of the present invention can be achieved by a hologram reproducing apparatus for reproducing record information from a holographic recording medium in which an interference pattern is recorded, the interference pattern being formed from object light corresponding to the record information and reference light, the hologram reproducing apparatus provided with: an irradiating device for irradiating the reference light onto the holographic recording medium; a data generating device for generating detection data including the record information, on the basis of detection light generated by the irradiation of the reference light; a setting device for setting a target irradiation position of the reference light on a surface of the holographic recording medium, on the basis of the detection data; and a displacing device for displacing the irradiating device, relatively to the holographic recording medium and along the surface, so as to irradiate the reference light in the target irradiation position.

According to the hologram reproducing apparatus of the present invention, by the operation of the irradiating device, the reference light is irradiated onto the holographic recording medium, to thereby obtain the detection light. Then, by the operation of the data generating device, the detection data including the record information is obtained on the basis of the detection light. If demodulation or the like is performed on the detection data, as described later, it is possible to reproduce the desired record information.

Particularly in the present invention, by the operation of the setting device, the target irradiation position, which indicates the position to be irradiated with the reference light, is set on the basis of the detection data. The detection data also includes information indicating a positional relationship between the recording medium and the reference light or the like, so that it is possible to set the target irradiation position by using the detection data. In particular, the target irradiation position on the surface of the holographic recording medium (or in the direction along the surface) is set. Incidentally, the "target irradiation position" may directly indicate the position to be irradiated with the reference light, or may indirectly indicate the position to be irradiated with the reference light by indicating a position to which the irradiating device is to be displaced, for example. Then, by the operation of the displacing device, the irradiating device is displaced relatively to the holographic recording medium (e.g. tracking servo control is performed), and as a result, the irradiating device can irradiate the reference light in the target irradiation position.

In particular, the target irradiation position of the reference light can be set on the basis of the detection data including the record information which is actually recorded on the holographic recording medium. Thus, it is possible to adjust a relative positional relationship between the irradiating device and the holographic recording medium (e.g. to perform the tracking servo control), in accordance with the actual condition of the record information (e.g. the recording position or the like of the record information on the holographic recording medium). Even if the relative positional relationship between the irradiating device and the holographic recording medium is adjusted on the basis of a guide groove or the like, which indicates the basic of the irradiation position of the reference light, if the record information (interference pattern) is not actually recorded along the guide groove, the reference light is not irradiated in the proper position. Moreover, although the record information is recorded originally along the guide groove, there is a possibility that the reference light is not irradiated in the proper position, depending on a change in temperature, a change in environment, or the contraction of the recording medium after the record information is recorded. According to the present invention, however, it is possible to set the target irradiation position on the basis of the actually reproduced detection data, in so-called real time. Thus, it is possible to adjust the relative positional relationship between the irradiating device and the holographic recording medium, more correctly or highly accurately, and it is possible to irradiate the reference light in the proper position in spite of the above-mentioned problem.

Consequently, according to the hologram reproducing apparatus of the present invention, it is possible to perform the tracking servo control or the like by using the detection data. Thus, as compared to such an aspect that only a signal for tracking servo control (e.g. a TE signal described later) is used, as in the conventional tracking servo control or the like, it is possible to adjust the relative positional relationship between the irradiating device and the holographic recording medium (to perform the tracking servo control), more correctly or highly accurately, in spite of variable conditions caused by a change in environment, such as a change in temperature, or the contraction of the recording medium after the record information is recorded, or the like.

In one aspect of the hologram reproducing apparatus of the present invention, the setting device sets the target irradiation position, on the basis of a positional relationship of a plurality of markers included in the detection data.

According to this aspect, in recording the information onto the holographic recording medium, the plurality of markers are recorded in predetermined positions, in each area corresponding to one page of the record information, for example, in order to specify one unit of the record information. In reproducing the record information, the plurality of markers are detected, to thereby detect one unit of the record information and generate the detection data. In such a condition that the adjustment of the relative position between the irradiating device and the holographic recording medium (i.e. the adjustment of the position of the reference light to be irradiated) is performed accurately, the plurality of markers in the detection data based on the detection light exist in the predetermined positions. Whereas in such a condition that the adjustment of the position of the reference light to be irradiated is not correctly performed, the plurality of markers are shifted from the predetermined positions. Thus, by setting the target irradiation position on the basis of the positional relationship of the plurality of markers in the detection data obtained from the detection light, it is possible to correctly set the target irradiation position.

In another aspect of the hologram reproducing apparatus of the present invention, the setting device sets the target irradiation position, on the basis of a result of comparing a position of at least one marker out of the plurality of markers and a predetermined basic position.

According to this aspect, if the adjustment of the relative position between the irradiating device and the holographic recording medium is correctly performed, the position of the marker included in the detection data obtained from the detection data is supposed to match the position of the marker which is a basic (i.e. basic position). Thus, by setting the target irradiation position on the basis of the result of comparing the position of the marker included in the detection data obtained from the detection data and the basic position, it is possible to adjust the relative position between the irradiating device and the holographic recording medium, more correctly or highly accurately.

In an aspect of the hologram reproducing apparatus in which the target irradiation position is set on the basis of the result of comparing the position of at least one marker and the basic position, as described above, the setting device may set the target irradiation position so as to displace a position which is irradiated with the reference light, by a difference in distance between the position of at least one marker and the basic position.

By such construction, it is possible to relatively easily set the target irradiation position which enables the reference light, which is originally to be irradiated in the basic position (e.g. the position in which the interference pattern is actually recorded), to be irradiated in the basic position, properly.

In an aspect of the hologram reproducing apparatus in which the target irradiation position is set on the basis of the result of comparing the position of at least one marker and the basic position, as described above, the basic position may be the position of at least one marker on a spatial modulator for spatial-modulating light from a light source on the basis of the record information to thereby generate the object light.

By such construction, it is possible to use, as the basic, the position of the marker recorded with the record information when the record information is recorded. Therefore, by comparing the position of the marker recorded with the record information when the record information is recorded with the position of the marker when the record information is reproduced, it is possible to adjust the relative positional relationship between the irradiating device and the holographic recording medium, more correctly or highly accurately.

In another aspect of the hologram reproducing apparatus of the present invention, the setting device sets the target irradiation position, on the basis of an error rate of the detection data.

According to this aspect, if the adjustment of the relative position between the irradiating device and the holographic recording medium is correctly performed, the error rate of the detection data reduces. Thus, by setting the target irradiation position on the basis of the error rate of the detection data, it is possible to adjust the relative positional relationship between the irradiating device and the holographic recording medium, more correctly or highly accurately.

In another aspect of the hologram reproducing apparatus of the present invention, the setting device sets the target irradiation position, on the basis of each of a positional relationship of a plurality of markers included in the detection data and an error rate of the detection data, and the displacing device displaces the irradiating device, so as to irradiate the reference light in the target irradiation position set on the basis of the positional relationship of the plurality of markers in a predetermined period after an operation of the data generating device is started, and so as to irradiate the reference light in the target irradiation position set on the basis of the error rate after the predetermined period elapses.

According to this aspect, the target irradiation position can be set on the basis of each of the positional relationship of the plurality of markers included in the detection data and the error rate of the detection data. Thus, it is possible to adjust the relative positional relationship between the irradiating device and the holographic recording medium, more correctly or highly accurately.

In another aspect of the hologram reproducing apparatus of the present invention, it is further provided with: an error signal generating device for generating an error signal indicating a shift between a position of a guide, which is formed in advance on the holographic recording medium and indicates a reference irradiation position of the reference light, and a position which is actually irradiated with the reference light, and the displacing device displaces the irradiating device, on the basis of the target irradiation position and the error signal.

According to this aspect, it is possible to adjust the relative positional relationship between the irradiating device and the holographic recording medium, more correctly or highly accurately, on the basis of each of the error signal (e.g. a tracking error signal generated on the basis of the guide or the like, as described later) and the target irradiation position.

In another aspect of the hologram reproducing apparatus of the present invention, the irradiating device can be displaced along the surface, and the displacing device displaces the irradiating device with respect to the holographic recording medium.

According to this aspect, it is possible to adjust the relative positional relationship between the irradiating device and the holographic recording medium, relatively easily or highly accurately, by incorporating a driving circuit including a motor or the like, for example, in the irradiating device, such as an optical pickup, for example.

In another aspect of the hologram reproducing apparatus of the present invention, the hologram reproducing apparatus is supported by a supporting device capable of displacing the holographic recording medium in a direction along the surface, and the displacing device displaces the holographic recording medium with respect to the irradiating device.

According to this aspect, it is possible to adjust the relative positional relationship between the irradiating device and the holographic recording medium, relatively easily or highly accurately, by incorporating a driving circuit including a motor or the like, for example, in the supporting device, such as a stage, for example.

(Hologram Reproducing Method)

The above object of the present invention can be also achieved by a hologram reproducing method on a hologram reproducing apparatus for reproducing record information from a holographic recording medium in which an interference pattern is recorded, the interference pattern being formed from object light corresponding to the record information and reference light, the hologram reproducing apparatus provided with: an irradiating device for irradiating the reference light onto the holographic recording medium, the hologram reproducing method provided with: a data generating process of generating detection data including the record information, on the basis of detection light generated by the irradiation of the reference light; a setting process of setting a target irradiation position of the reference light on a surface of the holographic recording medium, on the basis of the detection data; and a displacing process of displacing the irradiating device, relatively to the holographic recording medium and along the surface, so as to irradiate the reference light in the target irradiation position.

According to the hologram reproducing method of the present invention, it is possible to receive the same various benefits as those owned by the above-mentioned hologram reproducing apparatus of the present invention, Incidentally, in response to the various aspects owned by the above-mentioned hologram reproducing apparatus of the present invention, the hologram reproducing method of the present invention can also adopt various aspects.

(Hologram Recording/Reproducing Apparatus)

The above object of the present invention can be also achieved by hologram recording/reproducing apparatus provided with: a recording device for recording record information onto a holographic recording medium by recording an interference pattern formed from object light corresponding to the record information and reference light; an irradiating device for irradiating the reference light onto the holographic recording medium; a data generating device for generating detection data including the record information, on the basis of detection light generated by the irradiation of the reference light; a setting device for setting a target irradiation position of the reference light on a surface of the holographic recording medium, on the basis of the detection data; and a displacing device for displacing the irradiating device, relatively to the holographic recording medium and along the surface, so as to irradiate the reference light in the target irradiation position.

According to the hologram recording/reproducing apparatus of the present invention, it is possible to preferably record the record information onto the holographic recording medium, by recording the interference pattern onto the holographic recording medium by the operation of the recording device. Moreover, as in the above-mentioned hologram reproducing apparatus of the present invention, it is possible to perform the relative position control (e.g. the tracking servo control) between the irradiating device and the holographic recording medium, more correctly or highly accurately, in spite of variable conditions caused by a change in environment, such as a change in temperature, or the contraction of the recording medium after the record information is recorded, or the like.

Incidentally, in response to the various aspects owned by the above-mentioned hologram reproducing apparatus of the present invention, the hologram recording/reproducing apparatus of the present invention can also adopt various aspects. By this, it is possible to receive the above-mentioned various benefits.

(Hologram Recording/Reproducing Method)

The above object of the present invention can be also achieved by a hologram recording/reproducing method on a hologram recording/reproducing apparatus for recording record information onto a holographic recording medium by recording an interference pattern formed from reference light and object light corresponding to the record information or for reproducing the record information, the hologram recording/reproducing apparatus provided with: an irradiating device for irradiating the reference light onto the holographic recording medium, the hologram recording/reproducing method provided with: a recording device for recording the record information onto the holographic recording medium by recording the interference pattern; a data generating device for generating detection data including the record information, on the basis of detection light generated by the irradiation of the reference light; a setting device for setting a target irradiation position of the reference light on a surface of the holographic recording medium, on the basis of the detection data; and a displacing device for displacing the irradiating device, relatively to the holographic recording medium and along the surface, so as to irradiate the reference light in the target irradiation position.

According to the hologram recording/reproducing method of the present invention, it is possible to receive the same various benefits as those owned by the above-mentioned hologram recording/reproducing apparatus of the present invention, Incidentally, in response to the various aspects owned by the above-mentioned hologram recording/reproducing apparatus of the present invention, the hologram recording/reproducing method of the present invention can also adopt various aspects.

(Computer Program)

The above object of the present invention can be also achieved by a first computer program for hologram reproduction control to control a computer provided in the above-mentioned hologram reproducing apparatus of the present invention (including its various aspects), to make the computer function as at least one portion of the data generating device, the setting device, and the displacing device.

Moreover, the above object of the present invention can be also achieved by a second computer program hologram reproduction control to control a computer provided in the above-mentioned hologram recording/reproducing apparatus of the present invention (including its various aspects, to make the computer function as at least one portion of the recording device, the data generating device, the setting device, and the displacing device.

According to the first or second computer program of the present invention, the above-mentioned hologram reproducing apparatus or hologram recording/reproducing apparatus of the present invention can be relatively easily realized as a computer reads and executes the computer program from a program storage device, such as a ROM, a CD-ROM, a DVD-ROM, and a hard disk, or as it executes the computer program after downloading the program through a communication device.

Incidentally, in response to the various aspects of the above-mentioned hologram reproducing apparatus or hologram recording/reproducing apparatus of the present invention, the first or second computer program of the present invention can also adopt various aspects.

(Computer Program Product)

The above object of the present invention can be also achieved by a first computer program product in a computer-readable medium for tangibly embodying a program of instructions executable by a computer provided in the above-mentioned hologram reproducing apparatus of the present invention (including its various aspects), to make the computer function as at least one portion of the data generating device, the setting device, and the displacing device.

Moreover, the above object of the present invention can be also achieved by a second computer program product in a computer-readable medium for tangibly embodying a program of instructions executable by a computer provided in the above-mentioned hologram recording/reproducing apparatus of the present invention (including its various aspects), to make the computer function as at least one portion of the recording device, the data generating device, the setting device, and the displacing device.

According to the first or second computer program product of the present invention, the above-mentioned hologram reproducing apparatus or hologram recording/reproducing apparatus of the present invention can be embodied relatively readily, by loading the computer program product from a recording medium for storing the computer program product, such as a ROM (Read Only Memory), a CD-ROM (Compact Disc-Read Only Memory), a DVD-ROM (DVD Read Only Memory), a hard disk or the like, into the computer, or by downloading the computer program product, which may be a carrier wave, into the computer via a communication device. More specifically, the computer program product may include computer readable codes to cause the computer (or may comprise computer readable instructions for causing the computer) to function as the above-mentioned hologram reproducing apparatus or hologram recording/reproducing apparatus of the present invention.

Incidentally, in response to the various aspects of the above-mentioned hologram reproducing apparatus or hologram recording/reproducing apparatus of the present invention, the first or second computer program product of the present invention can also adopt various aspects.

These effects and other advantages of the present invention will become more apparent by referring to Best Mode for Carrying Out the Invention explained below, with the attached drawings.

As explained above, according to the hologram reproducing apparatus of the present invention, it is provided with the irradiating device, the data generating device, the setting device, and the displacing device, and according to the hologram reproducing method of the present invention, it is provided with the data generating process, the setting process, and the displacing process. Therefore, it is possible to perform the relative position control (e.g. the tracking servo control) between the irradiating device and the holographic recording medium, more correctly or highly accurately, in spite of variable conditions caused by a change in environment, such as a change in temperature, or the contraction of the recording medium after the record information is recorded, or the like.

BRIEF DESCRIPTION OF DRAWINGS

FIG. 1 is a view showing the optical system of a hologram recording/reproducing apparatus in embodiments of the present invention.

FIG. 2 are views showing one example of a 2-dimensional digital modulation method of record information.

FIG. 3 is a block diagram showing the general structure of the signal processing system of a hologram recording/reproducing apparatus in a first embodiment.

FIG. 4 is a view showing an example of a marker displayed on a spatial modulator.

FIG. 5 is an explanatory diagram showing a detection method of a marker position.

FIG. 6 are graphs showing a difference between a template image data position and its detection image data.

FIG. 7 is a view explaining the concept of tracking servo.

FIG. 8 are graphs showing a relationship between an objective lens position and a marker shift amount, and a relationship between the objective lens position and an error rate.

FIG. 9 is a flowchart showing a setting process of a tracking servo target value.

FIG. 10 is a flowchart showing a demodulation process of reproduction data.

FIG. 11 is a block diagram showing the general structure of the signal processing system of a hologram recording/reproducing apparatus in a second embodiment.

FIG. 12 are views explaining shift multiplex recording.

FIG. 13 is a block diagram showing the general structure of the signal processing system of a hologram recording/reproducing apparatus in a third embodiment.

DESCRIPTION OF REFERENCE CODES 1 holographic recording medium
10 pickup
14 spatial modulator
16 2D sensor
11 recording/reproduction laser
21 servo laser
25 four-division photo detector
32 tracking error generator
34 control circuit
35 tracking actuator control circuit
36 slider control circuit
37 Y-axis modulation mirror actuator control circuit
42 marker position detector
43 X-direction marker position extractor
45, 47, 55 servo target value setting device
48 Y-direction marker position extractor
46, 52 data demodulator
53 error rate measurement device

BEST MODE FOR CARRYING OUT THE INVENTION

Hereinafter, as the best mode for carrying out the present invention, embodiments of the hologram reproducing apparatus and method of the present invention, the hologram recording/reproducing apparatus and method, and the computer program will be explained in order, with reference to the drawings.

EMBODIMENT

Hereinafter, with reference to FIG. 1 to FIG. 15, the preferable embodiments of the present invention will be explained.

First Embodiment

Firstly, with reference to FIG. 1 to FIG. 10, a first embodiment of the hologram reproducing apparatus of the present invention will be explained.

FIG. 1 shows the structure of an optical system disposed in the pickup of a hologram recording/reproducing apparatus in the first embodiment of the present invention. In FIG. 1, a pickup 10 is provided with: a recording/reproduction laser 11 which generates laser light for information recording or reproduction; and a servo laser 21 which generates red laser light for tracking servo control.

In the information recording, a light beam Lo emitted from the recording/reproduction laser 11 is inputted to a spatial modulator 14, with its beam diameter expanded by a beam expander, which is formed of lenses 12 and 13. The spatial modulator 14 can be formed of a liquid crystal element, for example, and has a plurality of pixels arranged in a lattice pattern.

The spatial modulator 14 displays a pattern of white pixels and black pixels, which is obtained by 2D digital-modulating the input data to be recorded, and spatial-modulates the light beam by using the pattern. FIG. 2 show one example of the 2D digital modulation performed by the spatial modulator 14. In this example, as shown in FIG. 2(a), "0" and "1" in the digital input data (i.e. the input data to be recorded into a recording medium 1), are expressed by the combination of the white pixel and the black pixel. The vertical arrangement of the white pixel and the black pixel in this order corresponds to the input data "0", and the vertical arrangement of the black pixel and the white pixel in this order corresponds to the input data "1". This example is referred to as 1:2 difference modulation, because 1-bit input data is converted to 2-bit 2D modulation data.

The 2D modulation data, which is obtained by 2D digital-modulating input data of "00101101" in this modulation method, is shown as output modulation data in FIG. 2(b). Namely, the modulation image pattern constructed from the white pixels and the black pixels is displayed on the spatial modulator 14, as the output modulation data. The light beam Lo entering the spatial modulator 14 is transmitted through the white pixel portion of the spatial modulation image pattern, and is cut off in the black pixel portion of the spatial modulation image pattern. Thus, the light beam Lo optically modulated by the spatial modulation image pattern is emitted from the spatial modulator 14. Incidentally, the above-mentioned example is one example of the spatial-modulation, and the application of the present invention is not necessarily limited to the above-mentioned modulation method. Any 2D digital modulation method may be used if capable of converting the input data to a 2D modulation image pattern, and if capable of driving the spatial modulator to thereby spatial-modulating a beam or luminous flux, such as a so-called 2:4 modulation method in which 2-bit input data is converted to 4-bit 2D modulation data, for example.

The light beam Lo spatial-modulated by the spatial modulator 14 passes through a half mirror 15 and a dichroic mirror 17, and is focused by an objective lens 18 to thereby being irradiated onto the holographic recording medium 1. The dichroic mirror 17 has wavelength selectivity, and has such a property that it transmits the light beam Lo from the recording/reproduction laser 11 but reflects light beam Ls from the servo laser 21.

On the rear of the recording medium 1 (on the opposite side to the objective lens 18), a mirror 19 is provided. The light beam Lo focused by the objective lens 18 passes through the recording medium 1, and is reflected by the mirror 19, and then enters the recording medium again. Therefore, the light beam which directly comes from the objective lens 18 and the light beam which enters the medium after being reflected by the mirror 19 form an interference pattern in the recording medium 1, and the interference pattern is recorded into the recording medium 1.

The light beam L0 entering the recording medium 1 after being reflected by the mirror 19 passes through the dichroic mirror 17, and is reflected by the half mirror 15, and is received by a 2D sensor 16. The 2D sensor 16 may be a CCD array, a CMOS sensor, or the like, for example, and it outputs an electrical signal corresponding to the quantity of incident light.

On the other hand, in the information reproduction, the spatial modulator 14 is controlled in a non-modulation condition (i.e. all-optical transmission condition). Thus, the light beam Lo emitted from the recording/reproduction laser 11 passes through the half mirror 15, the dichroic mirror 17, and the objective lens 18, without being modulated by the spatial modulator 14, and is irradiated onto the recording medium 1. The light becomes a reference light for reproduction. In the recording medium 1, detection light is generated from the reference light for reproduction and the interference pattern recorded in the recording medium 1, and the detection light passes through the objective lens 18 and the dichroic mirror 17, and is reflected by the half mirror 15, and enters the 2D sensor 16. In this manner, the spatial modulation image pattern with the white and black pixels, generated by the spatial modulator 14 in the recording, is formed on the 2D sensor 16, and by detecting this pattern, the reproduction data corresponding to the recorded input data is obtained.

On the other hand, the light beam Ls outputted from the servo laser 21 (hereinafter referred to a "servo beam") passes through a half mirror 22, is reflected by a mirror 23, and is further reflected by the dichroic mirror 17, and enters the objective lens 18. The objective lens 18 focuses the servo beam Ls on the recording medium 1, together with the light beam from the recording/reproduction laser 11. The servo beam is reflected by a reflective layer disposed on the back surface of the recording medium 1, and is further reflected by the dichroic mirror 17, the mirror 23, and the mirror 22. Then, the servo beam Ls is received by a four-division photo detector 25 through a cylindrical lens 24. The four-division photo detector 25 outputs an electrical signal corresponding to the quantity of received light. Thus, from a difference (e.g. push-pull signal) in the quantity of light of each light receiving area of the four-division photo detector 25, a tracking error signal is obtained, which indicates how much deviation exists from the guide groove for tracking servo control, which is mounted on the recording medium 1, to perform the tracking servo control.

Next, the signal processing system of the hologram recording/reproducing apparatus in the embodiment will be explained. FIG. 3 is a block diagram showing the general structure of the signal processing system of the hologram recording/reproducing apparatus in the first embodiment.

The signal processing system of the hologram recording/reproducing apparatus is broadly classified into a reproduction system of reproducing the recorded information and outputting the reproduction data, and a servo system of performing servo control, such as focus servo, tracking servo, and spindle servo. FIG. 3 shows the general structure of the reproduction system and the general structure of a tracking servo system out of the servo system. In FIG. 3, a marker position detector 42 and a data demodulator 46 constitute the reproduction system. Moreover, an I-V converter 31, a tracking error (TE) generator 32, an adder 33, a control circuit 34, a tracking actuator control circuit 35, a slider control circuit 36, an X-direction marker position extractor 43, an adder 44, and a servo target value setting device 45 constitute the tracking servo system.

Incidentally, on the hologram recording/reproducing apparatus in the embodiment, the focus servo control or the like is also performed; however, its illustration and explanation are omitted because the method is not directly related to the present invention. A known method can be applied to the focus servo control or the like.

In FIG. 3, the recording medium 1 is disc-shaped, and is rotationally controlled by a spindle motor 8. The recording medium 1, rotationally controlled by the spindle motor 8, is irradiated with the light beam Lo for recording and reproduction, from the pickup 10. The pickup 10 is provided with the optical system illustrated in FIG. 1. As shown in FIG. 1, in the pickup 10, the light beam emitted from the recording/reproduction laser 11 is irradiated onto the recording medium 1, and the return light beam is received by the 2D sensor 16. The output data from the 2D sensor 16 is mainly processed in the reproduction system. Moreover, the light beam Ls emitted from the servo laser 21 is also irradiated onto the recording medium 1, and the return light beam is received by the four-division photo detector 25. The output data from the four-division photo detector 25 is mainly processed in the tracking servo system.

Firstly, the operation of the reproduction system will be explained. In FIG. 3, the 2D sensor 16 in the pickup 10 outputs a 2D image signal (hereinafter referred to as a "detection image data Ddet") corresponding to the quantity of received light. As described above, the detection image data Ddet has image information corresponding to the spatial modulation image pattern, which is generated on the basis of the record information in the recording and which is displayed on the spatial modulator 14.

The marker position detector 42 detects a marker position from the detection image data Ddet. The marker is information for identifying one unit (one page) of the record data recorded on the recording medium 1, and usually, it is constructed as a predetermined shape of image portion. The marker is appended to the record information in the recording, and is recorded into the recording medium 1. In the reproduction, by detecting the marker, the one unit (one page) of the record data is specified, to thereby reproduce the record data included in the 1 page.

Specifically, the marker is appended to the spatial modulation image pattern displayed on the spatial modulator 14. FIG. 4 shows an example of the spatial modulation image pattern including the marker. In the example of FIG. 4, a spatial modulation image pattern 50 is displayed in substantially the center in the display area of the spatial modulator 14. Moreover, T-shape markers 52 are displayed on the outer side of the spatial modulation image pattern 50 and in the four corners in the display area of the spatial modulator 14. The spatial modulator 14 spatial-modulates the input data received from a not-illustrated record signal processing system in the above-mentioned manner, to thereby generate the spatial modulation image pattern 50, and displays it in the display area of the spatial modulator 14, as shown in FIG. 4. Moreover, the spatial modulator 14 displays the predetermined markers 52 in the predetermined positions of the display area. In this manner, as schematically shown in FIG. 4, a display image 54 including the spatial modulation image pattern 50 and the markers 52 is displayed in the display area of the spatial modulator 14.

In the reproduction of the record information, the detection image data Ddet, outputted by the 2D sensor 16, has a digital value corresponding to the display image 54 displayed on the spatial modulator 14 in the recording. Thus, the marker position detector 42 expands the detection image data Ddet in a memory or the like and detects the marker position, to thereby extract 1 page of the record data.

The marker position is detected by template matching, for example. The template matching is a method of detecting the marker position in the detection image data Ddet, by matching the image data constituting the detection image data Ddet and the image data constituting the marker. FIG. 5 shows an example of the template matching. In FIG. 5, a reproduction data image 61 is an image of the detection image data Ddet corresponding to the display image 54 displayed on the spatial modulator 14 in the recording (however, for convenience of explanation, it shows only the area of the reproduction data image, and the illustration of the content of the reproduction image data itself is omitted). In contrast, a template image 62 is an image corresponding to the marker 52 used in the recording.

In the template matching, as shown in FIG. 5, the template image 62 is displaced in an X direction and a Y direction on the reproduction data image, to thereby calculate the value of the difference between the both. FIG. 6 show an example of graphs showing the difference value calculated in the X direction and the Y direction. FIG. 6(a) shows the difference value between the template image 62 and the reproduction data image 61 in the area corresponding to the template image 62 when the template image 62 is displaced in the X direction on the reproduction image data 61. Incidentally, as shown in FIG. 5, the coordinate value in the X direction uses a top-left coordinate point (a, b) of the template image 62. A point Xo which minimizes the difference value is the coordinates of the image portion corresponding to the marker 52 on the reproduction data image 61. FIG. 6(b) shows the difference value between the template image 62 and the reproduction data image 61 in the area corresponding to the template image 62 when the template image 62 is displaced in the Y direction on the reproduction image data 61. Incidentally, as shown in FIG. 5, the coordinate value in the Y direction uses the top-left coordinate point (a, b) of the template image 62. A point Yo which minimizes the difference value is the coordinates of the image portion corresponding to the marker 52 on the reproduction data image 61. Thus, the position coordinates of the marker 52 on the reproduction data image 61 is detected as (Xo, Yo).

In this manner, the marker position detector 42 detects the position coordinates of all the markers 52 included in the display image 54 displayed on the spatial modulator 14, and supplies them to the data demodulator 46 as marker position data Mp.

Incidentally, the X direction and the Y direction in the template matching, explained with reference to FIG. 4 and FIG. 5, correspond to a radial direction and a rotational direction based on the recording medium 1, respectively. Namely, in order to reproduce the page which is flatly spread and recorded on the recording medium 1, the spatial modulation image pattern 50 (or the reproduction image data 61) which spreads in the X direction and the Y direction, shown in FIG. 4 and FIG. 5, is obtained.

The data demodulator 46 specifies the positions of the markers 52 shown in FIG. 4 on the basis of the marker position data Mp, to thereby specify one page of the recorded record data. Moreover, it specifies the position of the spatial modulation image pattern 50 on the basis of the positions of the markers 52, to thereby demodulate the detection information data corresponding to the recorded record data.

At this time, the data modulator 46 performs geometric correction. The geometric correction is to correct a shift between pixel position in the information recording and pixel position in the information reproduction. The image is transcribed or copied from the spatial modulator 14 to the recording medium 1 through the optical system in the recording, and from the recording medium 1 to the 2D sensor 16 through the optical system in the reproduction. In the recording and the reproduction, there arises a difference in magnification ratio of the optical system, strain of the optical system, contraction of the recording medium, or the like, so that it is hardly possible to completely match the position of the pixel on the spatial modulator 14 in the recording and the position of the pixel on the 2D sensor in the reproduction. Thus, the geometric correction is performed on the basis of the marker position, for each one page of the record data. Namely, on the basis of the shift or deviation between the position of the original marker 52 on the spatial modulator 14 and the position of the marker detected in the reproduction data image 61, the position of each pixel included in the spatial modulation image pattern 50 is corrected, to thereby obtain the detection information data.

In this manner, the data demodulator 46 performs the data demodulation on the detection information data after the geometric correction, in a demodulation method corresponding to the 2D digital modulation method applied on the spatial modulator 14 in the recording, and outputs reproduction data Dr corresponding to the record data. Incidentally, after that, the reproduction data Dr is subjected to post-processing, including error correction, deinterleave, descramble, or the like.

Next, the operation of the tracking servo system will be explained. FIG. 7 shows the concept of the tracking servo control. The recording medium 1 is provided with: a recording layer 3: transparent protective layers 2 and 4 disposed on the upper and lower sides of the recording layer 3; and a reflective layer 5 disposed on the lower side of the transparent protective layer 4. As the recording layer 3, lithium niobate, photopolymer, or the like is used, which is the holographic optical recording medium. Moreover, the reflective layer 5 has wavelength selectivity, and has such a property that it transmits the recording/reproduction light beam Lo from the recording/reproduction laser 11 but reflects light beam Ls from the servo laser 21.

The tracking servo control is to displace the objective lens 18 in the horizontal direction of FIG. 7 so as to irradiate the recording/reproduction light beam Lo in a predetermined position of the recording layer 3. More specifically, the position in the horizontal direction (i.e. tracking position) of the objective lens 18 (i.e. the pickup 10) is controlled so as to accurately irradiate the servo light beam Ls onto a guide groove 6 (more preferably, onto the page which is the record information recorded so as to correspond to the guide groove 6) formed on the reflective layer 5 of the recording medium 1.

In the first embodiment, an explanation will be given regarding the position control of the objective lens 18 in the X direction which is the radial direction of the recording medium 1. Incidentally, the X direction and the Y direction naturally match the X direction and the Y direction explained in the above-mentioned template matching described above, or the like.

As shown in FIG. 1, the recording/reproduction light beam Lo spatial-modulated by the spatial modulator 14 is focused on the recording medium 1 by the objective lens 18. One portion of the light beam Lo is reflected by the mirror 19, and enters the recording medium 1 again. Thus, an interference pattern 7 is recorded by the light beam Lo before being reflected by the mirror 19 and the light beam Lo after being reflected.

In the embodiment, in addition to the recording/reproduction light beam Lo, the servo light beam Ls emitted by the servo laser 21 also enters the recording medium 1. The servo light beam Ls is reflected by the reflective layer 5, is reflected by the dichroic mirror 17, the mirror 23 and the half mirror 22, and further passes through the cylindrical lens 24, and then enters the four-division photo detector 25. Then, from the operation or calculation of the output signal of the four-division photo detector 25, the tracking error signal TE is obtained. Namely, the tracking error signal TE indicating how much deviation of the servo light beam Ls from the guide groove 6, which is mounted on the reflective layer, exists.

Specifically, in FIG. 3, the output current of the four-division photo detector 25 is converted to an output voltage by the I-V converter 31, and supplied to the TE generator 32. The TE generator 32 generates the tracking error signal TE on the basis of the voltage value, which corresponds to the quantity of received light of each light receiving element of the four-division photo detector 25 and which is supplied from the I-V converter 31. Then, the TE generator 32 inputs the tracking error signal TE to the adder 33.

In the adder 34, the target value of the tracking servo control (hereinafter referred to as a "servo target value") Tref is inputted from the servo target value setting device 45. The adder 33 subtracts the tracking error signal TE from the servo target value Tref, and supplies the result to the control circuit 34. The control circuit 34 supplies a control signal Sc to the tracking actuator control circuit 35 and the slider control circuit 36, depending on the difference between the servo target value Tref and the actual tracking error signal TE. The position in the X direction of the objective lens 18 (refer to FIG. 7) changes depending on the control signal Sc. In this manner, the tracking servo is performed by using the servo light beam Ls. Namely, in the embodiment, the I-V converter 31, the TE generator 32, the adder 33, the control circuit 34, the tracking actuator control circuit 35, and the slider control circuit 36 form a tracking servo loop.

Next, a determination method of determining the servo target value will be explained. The embodiment is characterized in that the target value of the tracking servo control is determined by using the detection result of the marker position. As described above, the marker position detector 42 detects the marker position on the basis of the detection image data Ddet from the 2D sensor 16, and supplies the marker position data Mp not only to the data demodulator 46 but also to the X-direction marker position extractor 43. The X-direction marker position extractor 43 extracts the position Xm in the X direction (i.e. X coordinates) of each of the plurality of markers detected.

If the position of the objective lens 18 with respect to the recording medium 1 is accurately controlled by the tracking servo control, the position of the marker 52 in the detection image data Ddet obtained from the 2D sensor 16 matches the position of the marker 52 displayed on the spatial modulator 14. On the other hand, if the position of the objective lens 18 is not accurately controlled, the position of the marker 52 in the detection image data Ddet is shifted from the position of the marker 52 displayed on the spatial modulator 14.

Thus, in the embodiment, the servo target value Tref is updated in accordance with the difference between the position (particularly the position in the X direction) of the marker 52 included in the detection image data Ddet and the accurate position of the marker 52 displayed on the spatial modulator 14. By this, it is possible to perform the tracking servo control, more accurately, by using not only the tracking error signal TE detected on the basis of the servo light beam Ls, but also the recording/reproduction light beam Lo which uses the information recording and reproduction.

Next, the determination method of determining the servo target value using the position of the marker will be specifically explained. The X-direction marker position extractor 43 extracts each X coordinates Xm from the position coordinates of the four markers 52 detected by the marker position detector 42. Here, the X coordinates Xm of the four markers are set as x1, x2, x3, and x4, respectively.

Then, on the adder 44, X coordinates Xref, which are the basis of each of the four markers 52, and the actual X coordinate of each of the four markers 52 is compared (added), to thereby calculate a shift amount Xe in the X direction. Then, the X coordinates Xref, which are the basic of the four markers 52, are known because they are the correct X coordinates of the marker 52 in such a condition that they are displayed on the spatial modulator 14. Specifically, the average value of the shift amount in the X direction of each marker 52 is calculated as the shift amount Xe. The shift amount Xe is expressed by $Xe=((x1-xr1)+(x2-xr2)+(x3-xr3)+(x4-xr4))/4$, wherein the X coordinates Xref, which are the basic of the four markers 52, are expressed as xr1, xr2, xr3, and xr4, respectively. Then, the shift amount Xe is outputted to the servo target value setting device 45.

The servo target value setting device 45 updates the servo target value Tref in accordance with the result of the shift amount Xe inputted from the adder 44. For example, it updates the servo target value Tref by using an equation of $Tref=Tef0+Xe\times\alpha$. Incidentally, "Tef0" is the initial value of the servo target value or the value after the previous updating, and "$\alpha$" is a constant determined depending on the gain of the tracking servo system and the optical system.

The above-mentioned processes are performed by the X-direction marker position extractor 43, the adder 44, and the servo target value setting device 45. Namely, the X-direction marker position extractor 43 extracts the positions in the X direction of the markers 52 included in the detection image data Ddet. The adder 44 calculates the shift amount Xe from the position in the X direction of each marker 52, and supplies the result to the servo target value setting device 45. The servo target value setting device 45 updates the servo target value Tref in accordance with the above-mentioned equation, for example, and supplies the updated servo target value Tref to the adder 33 in the tracking servo loop.

FIG. 8(a) shows a relationship in the shift between the position of the objective lens and the detected position of the marker 52. In FIG. 8(a), the horizontal axis indicates the shift amount of a track position in which the objective lens 18 exists from a basic track (specifically the track on which the record information is recorded), by using the displacement amount of the objective lens 18. The vertical axis indicates the difference between the X coordinates of each marker 52 and the basic X coordinates Xref, by using the amount of pixel on the spatial modulation data 50. Incidentally, the graph is, as shown in FIG. 4, the one when the markers 52 are disposed in the four corners of the spatial modulation image pattern 50. From the graph in FIG. 8(a), it can be seen that the shift amount of the track position of the objective lens 18 and the shift amount of the marker 52 are in an almost linear correlation. Then, it can be seen that the shift of the marker 52 disappears (i.e. becomes 0) in accordance with the position of the objective lens 18. Namely, in the case where the shift amount Xe calculated on the adder 44 shows a predetermined pixel value, if the objective lens 18 is displaced to the extent that corresponds to the predetermined pixel value, the position shift of the marker 52 is eliminated, and it is possible to irradiate the light beam Lo in the right position (i.e. the recording area in which the page which is the record data is stored).

FIG. 8(b) shows a relationship between the objective lens position and the error rate of the reproduced reproduction data. In FIG. 8(b), the horizontal axis indicates the shift amount of the track position of the objective lens 18 from the basic track, by using the displacement amount of the objective lens 18. The vertical axis indicates the error rate of the reproduction data Dr. From the graph in FIG. 8(b), it is understood that the error rate of the reproduction data, reproduced depending on the objective lens, i.e. the tracking condition, changes and that there is the objective lens position in which the error rate becomes minimum.

Moreover, from FIG. 8(a) and FIG. 8(b), it can be seen that when the shift amount of the marker 52 is 0, i.e. when the tracking condition is in a preferable condition, the shift of the tracking position of the objective lens 18 is eliminated and the error rate is minimum. As described above, since the marker position and the tracking condition have a correlation, it is possible to perform the accurate tracking servo control by determining the target value of the tracking servo control on the basis of the marker position in the embodiment.

In addition, as shown in FIG. 8(a), the shift of the track position of the objective lens 18 and the shift amount of the position of the marker 52 have a first-order linear correlation which reduces substantially monotonously. Thus, if the tracking servo control is performed on the basis of the marker position, there is such a great advantage that it is possible to determine not only the displacement amount of displacing the objective lens 18 but also its displacing direction at the same time.

Next, a setting process of setting the tracking servo target value will be explained with reference to FIG. 9. FIG. 9 is a flowchart showing the setting process of setting the tracking servo target value. Incidentally, this process is performed mainly by the marker position detector 42, the X-direction marker position extractor 43, and the servo target value setting device 45.

In FIG. 9, firstly, it is judged whether or not the marker position detector 42 obtains a predetermined amount (e.g. 1 page) of the detection image data Ddet (step S11), and if the marker position detector 42 obtains the predetermined amount (e.g. 1 page) of the detection image data Ddet, the marker position detector 42 detects the marker position included in the predetermined amount (e.g. 1 page) of the detection image data Ddet (step S12). This example explains one example in which positions M1 and M2 of the two markers 52 are detected out of the four markers 52 shown in FIG. 4. Then, if detecting the marker M1 (the step S13: Yes), the marker position detector 42 stores the position of the marker M1 (step S14), and detects the next marker M2 (step S15). Then, in the same manner, if detecting the marker M2 (the step S15: Yes), the marker position detector 42 stores the position of the marker M2 (step S16). The marker position detector 42 supplies the position coordinates of the markers M1 and M2 stored in this manner, to the X-direction marker position extractor 43, as the marker position data Mp.

The X-direction marker position extractor 43 extracts the X coordinates Xm of each of the markers M1 and M2 from the marker position data Mp and supplies them to the adder 44. In the adder 44, there is inputted the X coordinates Xref, which are the basic of the marker 52, and the difference (i.e. the shift amount Xe) is calculated (step S17). Then, the shift amount Xe is inputted to the servo target value setting device 45.

The servo target value setting device 45 sets the servo target value Tref in accordance with the above-mentioned equation, for example (step S18). In this manner, the servo target value is set The servo target value Tref set and updated in this manner is supplied to the adder 33 in the tracking servo loop. The tracking servo loop performs the tracking servo control, with the servo target value Tref as the target value.

Next, a demodulation process of demodulating the reproduction data will be explained with reference to FIG. 10. FIG. 10 is a flowchart showing the demodulation process of demodulating the reproduction data. This process is performed by the marker position detector 42 and the data demodulator 46 shown in FIG. 3.

Firstly, the marker position detector 42 judges whether or not the predetermined amount of the detection image data Ddet is obtained (step S21). If the predetermined amount of the detection image data is obtained, the marker position detector 42 detects the marker position and stores it. Then, the data demodulator 46 geometrically corrects the detection image data Ddet by using the detected marker position (step S22), and demodulates the reproduction data by using the data after the geometric correction is performed, and outputs it (step S23). In this manner, the reproduction data is reproduced from the recording medium 1.

Incidentally, in the above-mentioned example, the four markers 52 are separated from the spatial modulation image pattern 50 and disposed on the outer circumferential side thereof, as shown in FIG. 4. Thus, the marker area does not match the area of the spatial modulation image pattern, i.e. the area for the record information (data area). However, if the four markers are disposed in the four corners of the spatial modulation image pattern, the marker area matches the area of the spatial modulation image pattern, i.e. the data area.

In the present invention, the shape of the marker 52 is not limited to the T-shape shown in FIG. 4. Moreover, the position and the number of the markers 52 included in the display image 54 displayed on the spatial modulator 14 are also not limited to those in the example shown in FIG. 4. Moreover, in the example in FIG. 4, the four markers have the same shape, but different shapes of markers may be disposed.

As described above, in the first embodiment, the target value of the tracking servo control is fine-tuned so as to match the marker position detected by the 2D sensor and the basic value thereof. Thus, it is possible to match the image position of the spatial modulator in the recording system and the image position on the 2D sensor in the reproduction system. Therefore, it is possible to improve a so-called pixel matching property, to thereby accurately reproduce the spatial modulation pattern corresponding to the reproduction data to be reproduced.

Moreover, the servo target value is fine-tuned by using the marker position obtained in the reproduction system of the reproduction data, to thereby always optimize the tracking servo system. Thus, even if there is a change in environment, such as a change in temperature, or the contraction of the recording medium, or the like, it is possible to properly update the servo target value and continue the accurate tracking servo control.

Moreover, it is possible to use the detection result of the marker position for both the geometric correction to reproduce the reproduction data and the fine-tuning of the target value of the tracking servo control. In general, the template matching process for detecting the marker position requires a lot of time as it has a high calculation amount. However, the process result can be shared, so that it is possible to simultaneously stabilize the tracking servo control and improve the reproduction accuracy of the reproduction data, without increasing the processing time.

Moreover, even if the record data is recorded on the recording medium 1 by another recording/reproducing apparatus 1, it is possible to perform the proper tracking servo control, basic position variations or the like in wavelength of the light beam, on each recording/reproducing apparatus, because the tracking servo control is performed on the basis of the record page.

Second Embodiment

Next, with reference to FIG. 11 and FIG. 12, the second embodiment of the present invention will be explained. In the second embodiment, an explanation will be given regarding the position control of the objective lens 18 in the Y direction, which is the rotational direction of the recording medium 1.

FIG. 11 shows the general structure of a hologram recording/reproducing apparatus in the second embodiment. Incidentally, the same constituent elements as those of the hologram recording/reproducing apparatus in the first embodiment shown in FIG. 3 carry the same numerical references, and the explanation thereof is omitted, as occasion demands.

On the hologram recording/reproducing apparatus in the second embodiment shown in FIG. 11, the structure of the optical system owned by the pickup 10 is the same as that in the first embodiment shown in FIG. 1. Moreover, the Y-axis servo loop which is formed of the I-V converter 31, the TE generator 32, the adder 33, and the control circuit 34, is also the same as that in the first embodiment.

In the second embodiment, a Y-direction marker position extractor 48 is provided, instead of the X-direction marker position extractor 43 in the first embodiment, in order to calculate a shift amount Ye of the marker 52 in the Y direction by using a position Ym (i.e. Y coordinates) in the Y direction of each marker. Moreover, Y coordinates Yref, which are the basic of each marker 52, are inputted to the adder 44. Then, a servo target value setting device 47 is provided to set the servo target value (particularly, the servo target value in the Y direction) on the basis of the shift amount Ye outputted from the adder 44. Moreover, a Y-axis modulation mirror actuator control circuit 37 is provided in order to displace the luminous flux or beam Lo of the laser light LB, focused by the objective lens 18, in the Y direction. The other configuration is the same as that in the hologram recording/reproducing apparatus in the first embodiment.

In the second embodiment, on the basis of these structures, it is possible to displace the luminous flux Lo in the Y direction (i.e. in the rotational direction of the recording medium 1), by displacing (or by changing the angle or the position with respect to the laser light LB) a Y-axis modulation mirror, for example. Then, as in the first embodiment, the servo target value is fine-tuned by using the marker position obtained in the reproduction system of the reproduction data, to thereby always optimize the Y-axis servo system. Therefore, as in the first embodiment, even if there is a change in environment, such as a change in temperature, or the contraction of the recording medium, or the like, it is possible to properly update the servo target value and continue the accurate Y-axis servo control.

In particular, the hologram recording/reproducing apparatus performs shift multiplex recording as shown in FIG. 12, to thereby increase the recording density of the record data. Namely, one page shown in FIG. 12(a) is recorded in a partially overlapped condition with other pages, as shown in FIG. 12(b). At this time, in order to preferably reproduce each of the shift-multiplex-recorded plurality of pages, it is necessary to preferably fine-tune the position of the objective lens 18 (or the position of the luminous flux Lo). Even in this case, according to the second embodiment, the Y-axis servo control can be preferably performed even in the rotational direction of the recording medium 1, so that it is possible to irradiate the light beam Lo on each of the plurality of pages, in the rotational direction of the recording medium 1, for example. Moreover, by combining it with the rotation control of the recording medium 1 performed by the spindle motor 6, each page can be reproduced, more properly.

Incidentally, by combining the first embodiment and the second embodiment, it may be constructed such that the position control of the objective lens 18 (or the luminous flux Lo) is performed in both the X direction and the Y direction. Alternatively, even if the position control of the objective lens 18 (or the luminous flux Lo) is not performed in the directions along the orthogonal two axes, as explained in the first and second embodiments, it may be constructed such that the position control of the objective lens 18 (or the luminous flux Lo) is performed in one or a plurality of arbitrary directions if they are directions along (or parallel to) the surface of the recording medium 1.

Moreover, the recording medium 1 is not limited to a disc-shaped recording medium, but may be a plate-like recording medium provided with an X-Y driving circuit, for example. Moreover, if the recording medium 1 is the disc-shaped recording medium, the position control in the Y direction (i.e. the rotational direction of the recording medium 1) may be performed by the operation of the spindle motor 8. Namely, even for the spindle servo system, it is possible to adopt such construction that the servo target value is fine-tuned by using the marker position obtained in the reproduction system of the reproduction data, as in the above-mentioned first and second embodiments.

Moreover, even if one portion of the tracking servo loop, which is formed of the I-V converted 31, the TE generator 32, and the adder 33, does not exist (i.e. even if there is no TE signal), it may be constructed such that the tracking servo control is performed by using the servo target value Tref set on the basis of the marker position, for example.

Third Embodiment

Next, the third embodiment of the present invention will be explained. In the third embodiment, the error rate of the reproduction data is measured on the basis of the detection image data Ddet, and the servo target value of the tracking servo is set and updated on the basis of the error rate. Incidentally, except for this point, the third embodiment is the same as the first embodiment.

FIG. 13 shows the general structure of a hologram recording/reproducing apparatus in the third embodiment. Incidentally, the same constituent elements as those of the hologram recording/reproducing apparatus in the first embodiment shown in FIG. 3 carry the same numerical references, and the explanation thereof is omitted, as occasion demands.

On the hologram recording/reproducing apparatus in the third embodiment shown in FIG. 13, the structure of the optical system owned by the pickup 10 is the same as that in the first embodiment shown in FIG. 1. Moreover, as opposed to the first embodiment, the I-V converter 31 and the TE generator 32 are not included. The constituent elements of the adder 33 and the control circuit 34 are the same as those in the first embodiment, as the tracking servo loop.

In the third embodiment, the detection image data Ddet outputted from the 2D sensor 16 in the pickup 10 is demodulated by a data demodulator 52 and outputted as the reproduction data Dr. The data demodulator 52, as in the first embodiment, demodulates the reproduction data in the demodulation method corresponding to the 2D digital modulation performed by the spatial modulator 14 in the recording. Moreover, the information data demodulated by the data demodulator 52 is transmitted to an error rate measurement device 53. The error rate measurement device 53 measures an error rate Er and supplies it to a servo target value setting device 55.

The servo target value setting device 55 determines the servo target value Tref on the basis of the error rate. Specifically, the servo target value setting device 55 determines the servo target value Tref so as to minimize the error rate. One example of the relationship between the objective lens position and the error rate is shown in FIG. 8(b). The servo target value setting device 55 determines the servo target value Tref of the tracking servo loop so as to minimize the error rate, on the basis of the relationship shown in FIG. 8(b), for example. As previously explained with reference to FIG. 8(a) and FIG.

8(b), the preferable tracking condition of the objective lens 18 minimizes the error rate. Thus, by setting the servo target value so as to minimize the error rate, it is possible to set the proper servo target value.

As described above, in the third embodiment, the servo target value is determined on the basis of the error rate obtained in the reproduction system of the reproduction data. Thus, even if there is a change in environment, such as a change in temperature, or the contraction of the recording medium, or the like, it is possible to properly update the servo target value and continue the accurate tracking servo control.

In addition, moreover, it is unnecessary to provide one portion of the constituent elements of the tracking servo loop which is formed of the I-V converter 31, the TE generator 32, and the adder 33. Thus, the servo laser 21 is not necessarily provided in the pickup 10. Therefore, it is possible to make the structure of the optical system, such as the pickup 10, relatively simple.

Incidentally, in the third embodiment, moreover, the shift amount Xe outputted from the adder 44 is used as the tracking error signal TE. Even in such construction, the tracking control can be properly performed. However, obviously, the TE signal obtained in the construction as in the first and second embodiments may be also used.

Moreover, it is also possible to combine the above-mentioned first or second embodiment with the third embodiment for application. Namely, it is possible to combine and use the servo target value set on the basis of the marker position, as in the first and second embodiments, and the servo target value set on the basis of the error rate as in the third embodiment.

In this case, as the actual reproduction procedure of the reproduction data, firstly, the marker position is detected at the first stage, and the geometric correction of the 2D data is performed by using the marker position at the second stage, and the reproduction data through the geometric correction is demodulated and error-corrected at the third stage. At the third stage, the error rate can be obtained. Thus, the marker position is detected in order to obtain the error rate, and the servo target value is adjusted on the basis of the marker position detection result.

Specifically, as an initializing process, firstly, while the marker position is detected, the servo target value is adjusted on the basis of the detection result, to thereby determine a first servo target value. Then, while the servo target value is changed in accordance with the above-mentioned operation in a predetermined range centered on the first servo target value, the error rate is measured. At this time, simultaneously, the X-direction marker position Xm or the Y-direction marker position is extracted, and the relationship of the error rate vs. the marker position is stored. Then, the marker position and the servo target value are determined so as to minimize the error rate. In this manner, the initializing process is ended. The initializing process is performed when a disc is inserted on the recording/reproducing apparatus and when the disc is changed.

In the normal reproduction after the initializing process, there are possibly several methods, as the tracking servo control method.

In a first method, a second servo target value is used to perform the tracking servo control. In this case, the servo target value is not changed after the initial setting.

In a second method, the tracking servo control is started, with an initial value as the second servo target value, in the normal reproduction. Then, the error rate is measured, and if the error rate deteriorates beyond a specified value, the first servo target value obtained by the above-mentioned marker position detection is used to perform the tracking servo control. Then, if the error rate is improved from the specified value, the servo target value based on the error rate is used again to perform the tracking servo control.

Moreover, in the above-mentioned embodiments, the object light and the reference light in the recording are generated by using the light beam from the same light source in the optical system; however, the application of the present invention is not limited to this. Namely, even in such construction that the object light and the reference light are irradiated onto the recording medium as different luminous fluxes, the present invention can be applied.

Moreover, in the above-mentioned embodiments, the present invention is applied to the hologram recording/reproducing apparatus for recording information onto the holographic recording medium and reproducing the recorded information by recording the interference pattern formed by irradiating the reference light and the object light corresponding to the record information. Instead, it can be applied to the hologram reproducing apparatus for reproducing information from the holographic recording medium in which the interference pattern is recorded, the interference pattern being formed from the reference light and the object light corresponding to the record information.

INDUSTRIAL APPLICABILITY

The hologram recording/reproducing apparatus and method, and the hologram reproducing apparatus and method according to the present invention can be applied to an apparatus for and a method of recording and reproducing information with respect to a holographic recording medium. Moreover, the computer program of the present invention or products associated with the program can be applied to the hologram recording/reproducing apparatus and the hologram reproducing apparatus.

The invention claimed is

1. A hologram reproducing apparatus for reproducing recorded information from a holographic recording medium in which an interference pattern is recorded, the interference pattern being formed from object light corresponding to the information and reference light, said hologram reproducing apparatus comprising:

an irradiating device for irradiating the reference light onto the holographic recording medium;

a data generating device for generating detection data including recorded information, on the basis of detection light generated by the irradiation of the reference light;

a setting device for setting a target irradiation position of the reference light on a surface of the holographic recording medium, on the basis of a positional relationship of markers included in the detection data;

an error signal generating device for generating an error signal indicating a shift between a position of a guide, which is formed in advance on the holographic recording medium and indicates a reference irradiation position of the reference light, and a position which is actually irradiated with the reference light;

a displacing device for displacing said irradiating device, relative to the holographic recording medium and along the surface, so as to irradiate the reference light in the target irradiation position, on the basis of the target irradiation position and the error signal; and a data demodulating device for correcting positions of pixels included in the detection data by performing geometric correction, on the basis of the positional relationship of the markers.

2. The hologram reproducing apparatus according to claim 1, wherein said setting device sets the target irradiation position, on the basis of a result of comparing a position of at least one marker out of the markers and a predetermined basic position.

3. The hologram reproducing apparatus according to claim 2, wherein said setting device sets the target irradiation position so as to displace a position which is irradiated with the reference light, by a difference in distance between the position of at least one marker and the basic position.

4. The hologram reproducing apparatus according to claim 2, wherein the basic position is the position of at least one marker on a spatial modulator for spatial-modulating light from a light source on the basis of the information to thereby generate the object light.

5. The hologram reproducing apparatus according to claim 1, wherein said setting device sets the target irradiation position, on the basis of an error rate of the detection data.

6. The hologram reproducing apparatus according to claim 1, wherein
said setting device sets the target irradiation position, on the basis of each of the positional relationship of the markers included in the detection data and an error rate of the detection data, and
said displacing device displaces said irradiating device, so as to irradiate the reference light in the target irradiation position set on the basis of the positional relationship of the markers in a predetermined period after an operation of said data generating device is started, and so as to irradiate the reference light in the target irradiation position set on the basis of the error rate after the predetermined period elapses.

7. The hologram reproducing apparatus according to claim 1, wherein
said irradiating device can be displaced along the surface, and
said displacing device displaces said irradiating device with respect to the holographic recording medium.

8. The hologram reproducing apparatus according to claim 1, wherein
said hologram reproducing apparatus is supported by a supporting device capable of displacing the holographic recording medium in a direction along the surface, and
said displacing device displaces the holographic recording medium with respect to said irradiating device.

9. A hologram reproducing method on a hologram reproducing apparatus for reproducing recorded information from a holographic recording medium in which an interference pattern is recorded, the interference pattern being formed from object light corresponding to the information and reference light,
said hologram reproducing apparatus comprising:
an irradiating device for irradiating the reference light onto the holographic recording medium,
said hologram reproducing method comprising:
a data generating process of generating detection data including recorded information, on the basis of detection light generated by the irradiation of the reference light;
a setting process of setting a target irradiation position of the reference light on a surface of the holographic recording medium, on the basis of a positional relationship of markers included in the detection data;
an error signal generating process of generating an error signal indicating a shift between a position of a guide, which is formed in advance on the holographic recording medium and indicates a reference irradiation position of the reference light, and a position which is actually irradiated with the reference light;
a displacing process of displacing said irradiating device, relative to the holographic recording medium and along the surface, so as to irradiate the reference light in the target irradiation position, on the basis of the target irradiation position and the error signal; and
a data demodulating process of correcting positions of pixels included in the detection data by performing geometric correction, on the basis of the positional relationship of the markers.

10. A hologram recording / reproducing apparatus comprising:
a recording device for recording information onto a holographic recording medium by recording an interference pattern formed from object light corresponding to the information and reference light;
an irradiating device for irradiating the reference light onto the holographic recording medium;
a data generating device for generating detection data including recorded information, on the basis of detection light generated by the irradiation of the reference light;
a setting device for setting a target irradiation position of the reference light on a surface of the holographic recording medium, on the basis of a positional relationship of markers included in the detection data;
an error signal generating process of generating an error signal indicating a shift between a position of a guide, which is formed in advance on the holographic recording medium and indicates a reference irradiation position of the reference light, and a position which is actually irradiated with the reference light;
a displacing device for displacing said irradiating device, relative to the holographic recording medium and along the surface, so as to irradiate the reference light in the target irradiation position, on the basis of the target irradiation position and the error signal; and
a data demodulating device for correcting positions of pixels included in the detection data by performing geometric correction, on the basis of the positional relationship of the markers.

11. The hologram recording / reproducing apparatus according to claim 10, wherein said setting device sets the target irradiation position, on the basis of a result of comparing a position of at least one marker out of the markers and a predetermined basic position.

12. The hologram recording / reproducing apparatus according to claim 11, wherein the basic position is the position of at least one marker on a spatial modulator for spatial-modulating light from a light source on the basis of the information to thereby generate the object light.

13. The hologram recording / reproducing apparatus according to claim 10, wherein said setting device further sets the target irradiation position, on the basis of an error rate of the detection data.

14. The hologram recording / reproducing apparatus according to claim 10, wherein
said setting device sets the target irradiation position, on the basis of each of the positional relationship of the markers included in the detection data and an error rate of the detection data, and
said displacing device displaces said irradiating device, so as to irradiate the reference light in the target irradiation position set on the basis of the positional relationship of the plurality of markers in a predetermined period after an operation of said data generating device is started, and so as to irradiate the reference light in the target irradiation position set on the basis of the error rate after the predetermined period elapses.

15. A hologram recording / reproducing method on a hologram recording / reproducing apparatus for recording information onto a holographic recording medium by recording an interference pattern formed from object light corresponding to the information and reference light or for reproducing recorded information, said hologram recording / reproducing apparatus comprising:

an irradiating device for irradiating the reference light onto the holographic recording medium, said hologram recording / reproducing method comprising:

a recording process of recording the information onto the holographic recording medium by recording the interference pattern;

a data generating process of generating detection data including recorded information, on the basis of detection light generated by the irradiation of the reference light;

a setting process of setting a target irradiation position of the reference light on a surface of the holographic recording medium, on the basis of a positional relationship of markers included in the detection data;

an error signal generating process of generating an error signal indicating a shift between a position of a guide, which is formed in advance on the holographic recording medium and indicates a reference irradiation position of the reference light, and a position which is actually irradiated with the reference light;

a displacing process of displacing said irradiating device, relative to the holographic recording medium and along the surface, so as to irradiate the reference light in the target irradiation position, on the basis of the target irradiation position and the error signal; and a data demodulating process of correcting positions of pixels included in the detection data by performing geometric correction, on the basis of the positional relationship of the markers.

16. A computer program product in a computer-readable medium for tangibly embodying a program of instructions executable by a computer provided in a hologram reproducing apparatus, to make the computer function as at least one portion of a data generating device, a setting device, an error signal generating device, and a displacing device, said hologram reproducing apparatus for reproducing recorded information from a holographic recording medium in which an interference pattern is recorded, the interference pattern being formed from object light corresponding to the information and reference light, said hologram reproducing apparatus comprising:

an irradiating device for irradiating the reference light onto the holographic recording medium;

said data generating device for generating detection data including recorded information, on the basis of detection light generated by the irradiation of the reference light;

said setting device for setting a target irradiation position of the reference light on a surface of the holographic recording medium, on the basis of a positional relationship of markers included in the detection data;

said error signal generating device for generating an error signal indicating a shift between a position of a guide, which is formed in advance on the holographic recording medium and indicates a reference irradiation position of the reference light, and a position which is actually irradiated with the reference light;

said displacing device for displacing said irradiating device, relative to the holographic recording medium and along the surface, so as to irradiate the reference light in the target irradiation position, on the basis of the target irradiation position and the error signal; and a data demodulating device for correcting positions of pixels included in the detection data by performing geometric correction, on the basis of the positional relationship of the markers.

17. A computer program product in a computer-readable medium for tangibly embodying a program of instructions executable by a computer provided in a hologram recording / reproducing apparatus, to make the computer function as at least one portion of a recording device, a data generating device, a setting device, an error signal generating device, and a displacing device, said hologram recording / reproducing apparatus comprising:

said recording device for recording information onto a holographic recording medium by recording an interference pattern formed from object light corresponding to the information and reference light;

an irradiating device for irradiating the reference light onto the holographic recording medium;

said data generating device for generating detection data including recorded information, on the basis of detection light generated by the irradiation of the reference light;

said setting device for setting a target irradiation position of the reference light on a surface of the holographic recording medium, on the basis of a positional relationship of markers included in the detection data;

said error signal generating process of generating an error signal indicating a shift between a position of a guide, which is formed in advance on the holographic recording medium and indicates a reference irradiation position of the reference light, and a position which is actually irradiated with the reference light;

said displacing device for displacing said irradiating device, relative to the holographic recording medium and along the surface, so as to irradiate the reference light in the target irradiation position, on the basis of the target irradiation position and the error signal; and a data demodulating device for correcting positions of pixels included in the detection data by performing geometric correction, on the basis of the positional relationship of the markers.

* * * * *